(12) United States Patent
Prakash et al.

(10) Patent No.: US 6,778,698 B1
(45) Date of Patent: Aug. 17, 2004

(54) METHOD AND APPARATUS FOR DIGITAL IMAGE SEGMENTATION

(75) Inventors: Adityo Prakash, Redwood Shores, CA (US); Edward R. Ratner, Sunnyvale, CA (US); John S. Chen, San Jose, CA (US); David L. Cook, Playa Del Rey, CA (US)

(73) Assignee: PTS Corporation, San Jose, CA (US)

( * ) Notice: Subject to any disclaimer, the term of this patent is extended or adjusted under 35 U.S.C. 154(b) by 561 days.

(21) Appl. No.: 09/591,438

(22) Filed: Jun. 9, 2000

Related U.S. Application Data

(60) Provisional application No. 60/139,134, filed on Jun. 11, 1999.

(51) Int. Cl.[7] .................................................. G06K 9/48
(52) U.S. Cl. ........................ 382/164; 382/173; 382/242
(58) Field of Search ................................ 382/162, 164, 382/173, 242; 358/1.9

(56) References Cited

U.S. PATENT DOCUMENTS

| | | | | |
|---|---|---|---|---|
| 4,685,071 A | * | 8/1987 | Lee ............................ | 382/162 |
| 5,181,257 A | * | 1/1993 | Steiner et al. .............. | 382/162 |
| 5,589,851 A | | 12/1996 | Valdés et al. | |
| 5,937,083 A | | 8/1999 | Ostuni | |
| 6,370,278 B1 | * | 4/2002 | Waguri ....................... | 382/266 |
| 6,415,053 B1 | * | 7/2002 | Norimatsu .................. | 382/199 |
| 6,608,929 B1 | * | 8/2003 | Shiratani .................... | 382/173 |

FOREIGN PATENT DOCUMENTS

EP 0 853 293 A1 7/1998

OTHER PUBLICATIONS

Lee et al, Detecting boundaries in a vector field, IEEE Transactions on Signal Processing, May 1991, vol. 39, iss 5, p 1181–1194.*

Gonzalez et al, Digital Image Processing, Addison–Wesley Publishing Company, reprint 1993, p 226–229 and 416–432.*

Chen–Chau Chu et al, The integration of image segmentation maps using region and edge information, IEEE Transactions on Pattern Analysis and Machine Intelligence, Dec. 1993, vol. 15, iss 12 p 1241–1252.*

Jiang Gangyi et al, Robust color edge detection using color–scale morphology, Proceedings of the 1996 IEEE TENCON Digital Signal Processing Applications, Nov. 26–29, 1996, vol. 1, p 227–232.*

Tao et al, Color image edge detection using cluster analysis, Proceedings of the International Conference on Image Processing, Oct. 26–29, 1997, vol. 1, p 834–836.*

Sangwine, S J, Colour image edge detector based on quaternion convolution, Electronics Letters, May 14, 1998, vol. 34, iss 10, p 969–971.*

(List continued on next page.)

*Primary Examiner*—Bhavesh M. Mehta
*Assistant Examiner*—Christopher Sukhaphadhana
(74) *Attorney, Agent, or Firm*—Okamoto & Benedicto LLP

(57) ABSTRACT

An image segmenter uses one or more techniques to accurately segment an image, including the use of a progressive flood fill to fill incompletely bounded segments, the use of a plurality of scaled transformations and guiding segmentation at one scale with segmentation results from another scale, detecting edges using a composite image that is a composite of multiple color planes, generating edge chains using multiple classes of edge pixels, generating edge chains using the plurality of scaled transformations, and/or filtering spurious edges at one scale based on edges detected at another scale.

6 Claims, 25 Drawing Sheets-

OTHER PUBLICATIONS

Konishi et al, Fundamental bounds on edge detection: and information theoretic evaluation of different edge cues, IEEE Computer Society Conference on Computer Vision and Pattern Recognition, Jun. 23–25, 1999, vol. 1, p 573–579.*

J. P. Dérutin, et al., *Edge and Region Image Segmentation Processes On The Parallel Vision Machine: Transvision*, 1993 IEEE, pp 410–420.

Eli Saber, et al., *Fusion of color and Edge Information for Improved Segmentation and Edge Linking*, 1996 IEEEE, pp 2176–2179.

Web page, "CVonline: Citation of Contents" at URL http://www.dai.ed.ac.uk/CVonline/SUPPORT/citations.htm (undated).

Itti, "Extraction of Early Visual Features" at URL http://www.klab.caltech.edu/~itti/attention/publications/00_VR/node.3.html (Oct. 11, 1999).

Itti, "Combining Information Across Multipe Maps" at URL http://www.klab.caltech.edu/~itti/attention/publications/00_VR/node4.html (Oct. 11, 1999).

Itti et al., "A Saliency–Based Search Mechanism for Overt and Covert Shifts of Visual Attention" at URL http://www.klab.caltech.edu/~itti/attention/publications/00_VR/paper_twocol.html (Oct. 11, 1999).

Itti et al., "A Comparison of Feature Combination Strategies for Saliency–Based Visual Attention Systems" at URL http://www.klab.caltech.edu/~itti/attention/publications/99_HVEI/ (Feb. 23, 1999).

Itti, "Iterative Localized Interactions" at URL http://www.klab.caltech.edu/~itti/attention/publications/99_HVEI/node6.html (Feb. 23, 1999).

Lindenberg, "Scale–Space Theory in Computer Vision" URL http://www.bion.kth.se/~tony/preface.html (Sep., 1993).

Marr et al., "Theory of Edge Detection", *The Raw Primal Sketch*, Proc. R. Soc. Lond., B 201, pp. 187–217 (1980).

Morse et al., "Lecture 3: Data Structures for Image Analysis" at URL http://www.dai.ed.ac.uk/CVonline/Local_Copies/Morse/data–structures.pdf (Jan. 10, 2000).

Robyn Owens, "Classical Feature Detection" at URL http://www.dai.ed.ac.uk/CVonline/Local_Copies/Owens/Lect6/node.2.html.

Guy Robinson, "17.3.5 Edge Detection via Zero Crossing" at URL http://www.npac.syr.edu/copywrite/pcw/node433.html (Mar. 1, 1995).

"55:148 Digital Image Processing" Chapter 5, Part II, *Segmentation: Edge–Based Segmentation*, at URL http://www.icaen.uiowa.edu/~dip/Lecture/Segmentation2.html (Jan. 28, 1997).

Tao et al., "Color Image Edge Detection Using Cluster Analysis", Proceedings of the 1997 International Conference on Image Processing, at URL http://www.computer.org/proceedings/icip97/8183–069.htm (1997).

"Edges: The Canny Edge Detector" at URL http://www.dai.ed.ac.uk/CVonline/Local_Copies/Marble/low/edges/canny.htm (Jul. 4, 1996).

Cook et al., "Multiresolution Sequential Edge Linking", Proceedings of the International Conference on Image Processing (ICIP), pp. 41–44 (Oct. 23, 1995).

Li et al., "Pyramid Edge Detection for Color Images", Optical Engineering, vol. 36, No. 5, pp. 1431–1437 (May 1, 1997).

S. Chun Zhu et al.; "Region Competition; Unifying Snakes, Region Growing, and Bayes/MDL for Multiband Image Segmentation;" IEEE Transactions on Pattern Analysis and Machine Intelligence, vol. 18, No. 9, Sep. 1996, pp. 884–900.

* cited by examiner

Filled Image Pixel

Unfilled Image Pixel

Edge Pixel

Brush

- ⊠ Strong Edge Pixel
- ⦀ Weak Edge Pixel
- ⍁ Interior Image Pixel
- ○ Background Image Pixel Scale 2 Coarser scale Scale 1 Finer scale

- - - - - Chain

Scale 2 (Coarser)

Scale 1

Scale 1 - after extension of edge chain based on scale 2

Previous Frame (Frame 1)

Current Frame (Frame 2)
Before Threshold

Current Frame (Frame 2)
After Threshold

METHOD AND APPARATUS FOR DIGITAL IMAGE SEGMENTATION

CROSS-REFERENCES TO RELATED APPLICATIONS

This application claims priority from U.S. Provisional Patent Application No. 60/139,134, filed Jun. 11, 1999, the disclosure of which is incorporated herein in its entirety by reference for all purposes.

FIELD OF THE INVENTION

The present invention relates to image processing in general, and more particularly to the problem of image segmentation where an image needs to be automatically segmented into segments based on the pixel color values of the image.

BACKGROUND OF THE INVENTION

Image segmentation is the process of partitioning an image into a set of non-overlapping parts, or segments, that together constitute the entire image. Image segmentation is useful for many applications, one of which is machine learning.

In machine learning, an image is segmented into a set of segments and a designated segment from the image or another image is compared with the set of segments. When a machine successfully matches the designated segment with one or more segments from a segmented image, the machine draws an appropriate conclusion. For example, image segmentation could be used to identify misshapen blood corpuscles for determination of blood diseases such as sickle cell anemia. In this example, the designated segment would be a diseased blood cell. By counting the number of segment matches in a given image, the relative health of a patient's blood can be determined. Other applications include compression and processes that process areas of the image in ways that depend on the areas' segments.

As the terms are used herein, an image is data derived from a multi-dimensional signal. The signal might be originated or generated either naturally or artificially. This multi-dimensional signal (where the dimension could be one, two, three, or more) may be represented as an array of pixel color values such that pixels placed in an array and colored according to each pixel's color value would represent the image. Each pixel has a location and can be thought of as being a point at that location or as a shape that fills the area around the pixel such that any point within the image is considered to be "in" a pixel's area or considered to be part of the pixel. The image itself might be a multidimensional pixel array on a display, on a printed page, an array stored in memory, or a data signal being transmitted and representing the image. The multidimensional pixel array can be a two-dimensional array for a two-dimensional image, a three-dimensional array for a three-dimensional image, or some other number of dimensions.

The image can be an image of a physical space or plane or an image of a simulated and/or computer-generated space or plane. In the computer graphic arts, a common image is a two-dimensional view of a computer-generated three-dimensional space (such as a geometric model of objects and light sources in a three-space). An image can be a single image or one of a plurality of images that, when arranged in a suitable time order, form a moving image, herein referred to as a video sequence.

When an image is segmented, the image is represented by a plurality of segments. The degenerate case of a single segment comprising the entire image is within the definition of segment used here, but the typical segmentation divides an image into at least two segments. In many images, the segmentation divides the image into a background segment and one or more foreground segments.

In one segmentation method, an image is segmented such that each segment represents a region of the image where the pixel color values are more or less uniform within the segment, but dramatically change at the edges of the image. In that implementation, the regions are connected, i.e., it is possible to move pixel-by-pixel from any one pixel in the region to any other pixel in the region without going outside the region.

Pixel color values can be selected from any number of pixel color spaces. One color space in common use is known as the YUV color space, wherein a pixel color value is described by the triple (Y, U, V), where the Y component refers to a grayscale intensity or luminance, and U and V refer to two chrominance components. The YUV color space is commonly seen in television applications. Another common color space is referred to as the RGB color space, wherein R, G and B refer to the Red, Green and Blue color components, respectively. The RGB color space is commonly seen in computer graphics representations, along with CYMB (cyan, yellow, magenta, black) often used with computer printers.

An example of image segmentation is illustrated in FIG. 1. There, an image 10 is of a shirt 20 on a background 15. The image can be segmented into segments based on colors (the shading of shirt 20 in FIG. 1 represents a color distinct from the colors of background 15 or pockets 70, 80). Thus, background 15, shirt 20, buttons 30, 40, 50, 60 and pockets 70, 80 are segmented into separate segments in this example. In this example, if each segment has a very distinct color and the objects in image 10 end cleanly at pixel boundaries, segmentation is a simple process. In general, however, generating accurate image segments is a difficult problem and there is much open research on this problem, such as in the field of "computer vision" research. One reason segmentation is often difficult is that a typical image includes noise introduced from various sources including, but not limited to, the digitization process when the image is captured by physical devices and the image also includes regions that do not have well-defined boundaries.

There are several ways of approaching the task of image segmentation, which can generally be grouped into the following: 1) histogram-based segmentation; 2) traditional edge-based segmentation; 3) region-based segmentation; and 4) hybrid segmentation, in which several of the other approaches are combined. Each of these approaches is described below.

1. Histogram-based Segmentation

Segmentation based upon a histogram technique relies on the determination of the color distribution in each segment. This technique uses only one color plane of the image, typically an intensity color plane (also referred to as the greyscale portion of the image), for segmentation. To perform the technique a processor creates a histogram of the pixel color values in that plane. A histogram is a graph with a series of "intervals" each representing a range of values arrayed along one axis and the total number of occurrences of the values within each range shown along the other axis. The histogram can be used to determine the number of pixels in each segment, by assuming that the color distribution within each segment will be roughly a Gaussian, or bell-shaped, distribution and the color distribution for the entire image will be a sum of Gaussian distributions. Histogram-based techniques attempt to recover the individual Gaussian curves by varying the size of the intervals, i.e., increasing or decreasing the value range, and looking for high or low points. Once the distributions have been ascertained, then each pixel is assigned to the segment with its corresponding intensity range.

The histogram method is fraught with errors. The fundamental assumption that the color distribution is Gaussian is at best a guess, which may not be accurate for all images. In addition, two separate regions of identical intensity will be considered the same segment. Further, the Gaussian distributions recovered by the histogram are incomplete in that they cut off at the ends, thus eliminating some pixels. Further, this method of segmentation is only semi-automatic, in that the technique requires that the number of segments are previously known and that all of the segments are all roughly the same size.

2. Traditional Edge-Based Segmentation

Traditional edge-based segmentation uses differences in color or greyscale intensities to determine edge pixels that delineate various regions within an image. This approach typically assumes that when edge pixels are identified, the edge pixels will completely enclose distinct regions within the image, thereby indicating the segments. However, traditional edge detection techniques often fail to identify all the pixels that are in fact edge pixels, due to noise in images or other artifacts. If some edge pixels are missed, some plurality of distinct regions might be misidentified as being a single segment.

3. Region-based Segmentation

Region based segmentation attempts to detect homogenous regions and designate them as segments. One class of region-based approaches starts with small uniform regions within the image and tries to merge neighboring regions that are of very close color value in order to form larger regions. Conversely, another class of region-based approaches starts with the entire image and attempts to split the image into multiple homogeneous regions. Both of these approaches result in the image being split at regions where some homogeneity requirements are not met.

The first class of region based segmentation approaches is limited in that the segment edges are approximated depending on the method of dividing the original image. A problem with the second class of region based approaches is that the segments created tend to be distorted relative to the actual underlying segments.

4. Hybrid Segmentation The goal of hybrid techniques is to combine processes from multiple previous segmentation processes to improve image segmentation. Most hybrid techniques are a combination of edge segmentation and region-based segmentation, with the image being segmented using one of the processes and being continued with the other process. The hybrid techniques attempt to generate better segmentation than a single process alone. However, hybrid methods have proven to require significant user guidance and prior knowledge of the image to be segmented, thus making then unsuitable for applications requiring fully automated segmentation.

SUMMARY OF THE INVENTION

The present invention solves many of the problems of previous segmentation processes. In an image segmenter according to one embodiment of the present invention, the image segmenter uses one or more techniques to accurately segment an image, including the use of a progressive flood fill to fill incompletely bounded segments, the use of a plurality of scaled transformations and guiding segmentation at one scale with segmentation results from another scale, detecting edges using a composite image that is a composite of multiple color planes, generating edge chains using multiple classes of edge pixels, generating edge chains using the plurality of scaled transformations, and/or filtering spurious edges at one scale based on edges detected at another scale.

A further understanding of the nature and the advantages of the inventions disclosed herein may be realized by reference to the remaining portions of the specification and the attached drawings.

BRIEF DESCRIPTION OF THE DRAWINGS

FIG. 17 illustrates a process for continuing edge chains over small gaps; FIG. 17(b) shows the gap filled in.

FIG. 18 illustrates a process for linking edge chains from more than one scale.

FIG. 19 illustrates a process of edge chain extension.

DESCRIPTION OF THE SPECIFIC EMBODIMENTS

Figure 1:
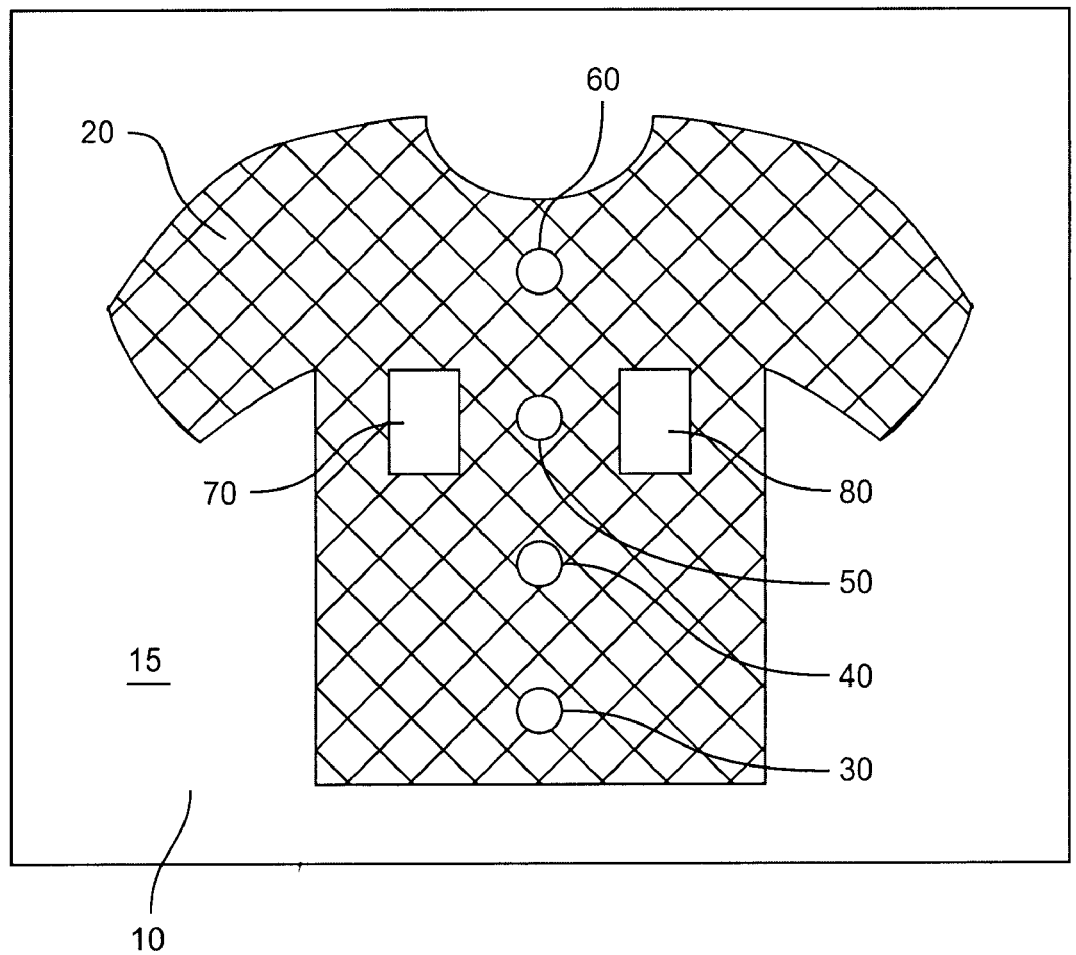
FIG. 1 is an image illustrating a simple image segmentation process.

Segmentation is the process by which a digital image is subdivided into components referred to as "segments" of the image. In a color value based segmentation process, each segment represents an area bounded by radical or sharp changes in color values within the image, as shown in FIG. 1 and as described within the backgrounds In many examples described in detail herein, the image represents a two-dimensional signal, but it should be understood that the methods and apparatus described herein can be adapted for other numbers of dimensions by one of skill in the art after reading this disclosure.

Figure 2:
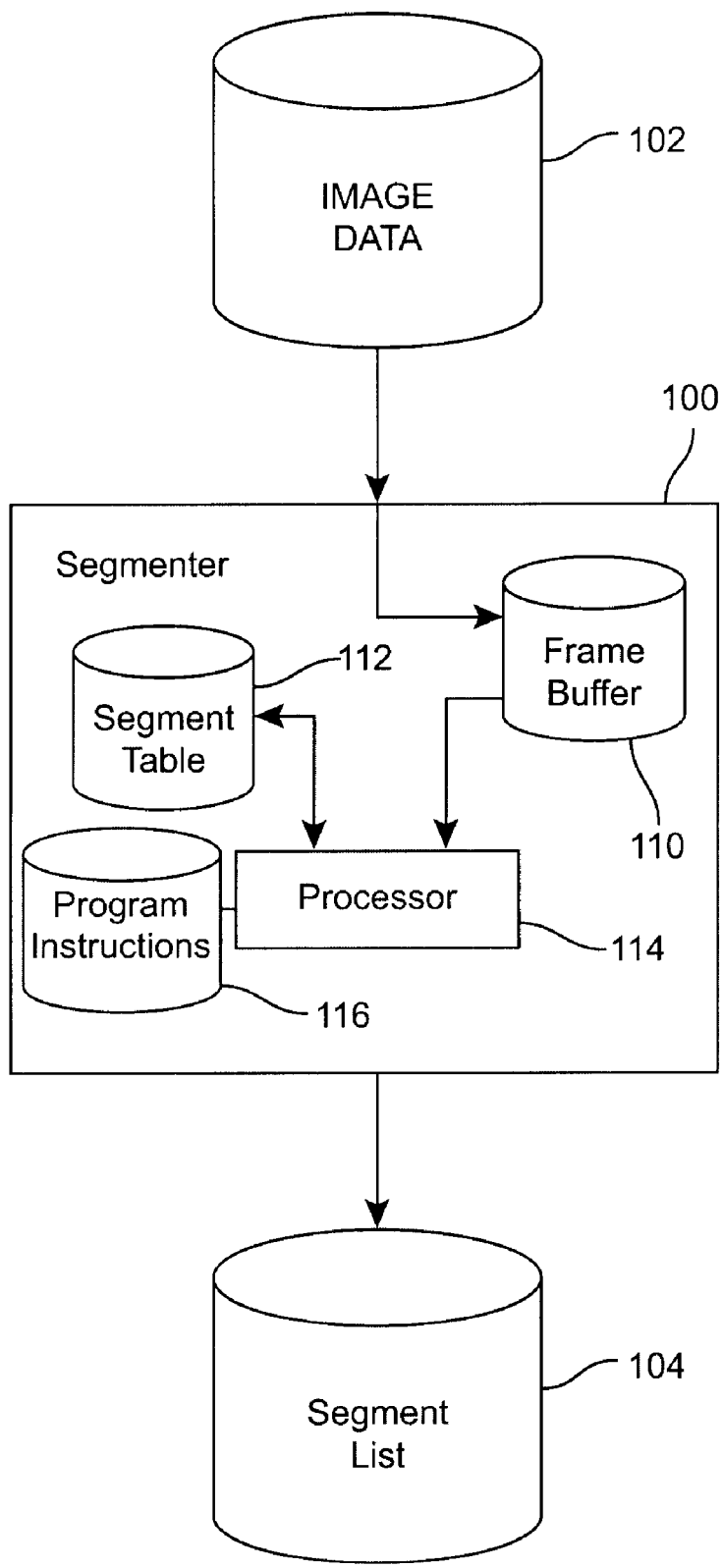
FIG. 2 is a block diagram of an apparatus for segmenting images.

FIG. 2 is a block diagram of a system including a segmenter 100 that generates segment definitions for an image according to one embodiment of the present invention. Segmenter 100 accepts as its input image data 102 and outputs a segment list 104. The format of image data 102 and segment list 104 can vary depending on the nature of the image, its storage requirements and other processing not related the segmentation process, but one form of storage for image data 102 is as an array of pixel color values, possibly compressed, and stored in one of many possible industry-standard image formats, such as raw data, bitmaps, MPEG, JPEG, GIF, etc. In memory, image data 102 might be stored as a two-dimensional array of values, where each value is a pixel color value. The pixel color value might have several components. For example, an image might be a 1024 by 768 array of pixels, with each pixel's color value represented by three (red, green, blue) component values ranging from 0 to 255. The format of segment list 104 might be stored as a run-length encoded ordered list of midpixels (defined below with reference to FIG. 6) or image pixels that comprise the bounds of each segment.

Segmenter 100 is shown comprising a frame buffer 110 that holds the image data as it is being considered, a segment table 112 that holds data about the segments identified or to be identified, and a processor 114 that operates on frame buffer 100 to generate segment data according to program instructions 116 provided in segmenter 100. Several aspects of program instructions 116 are described below and might include program instructions corresponding to some or all of the methods and processes for segmentation and in support of segmentation described herein.

Figure 3:
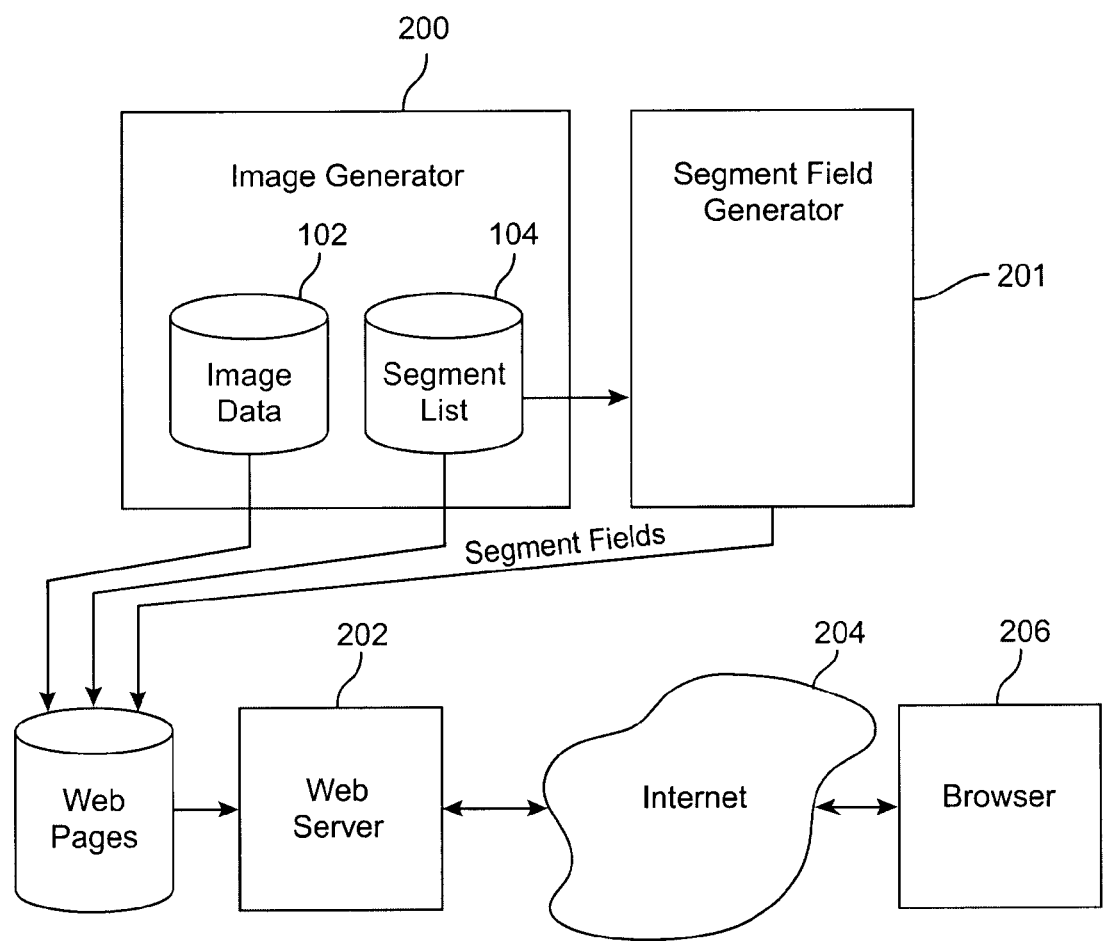
FIG. 3 is a block diagram of a system in which a segmented image might be used.

FIG. 3 illustrates a system in which segment list 104 might be used. As shown there, an image generator 200 generates an image, possibly using conventional image generation or image capture techniques, and stores data representing that image as image data 102. A segmenter, such as segmenter 100 shown in FIG. 2, is used to generate segment list 104 as described above. Image generator 200 provides segment list 104 to a segment field generator 201 that generates data for each of the segments. Such data might include a label, a clickable link (such as a Uniform Resource Locator, or "URL"), and other data not necessarily extracted from the image but associated with segments of the image.

Image data 102, segment list 104 and the segment fields are stored as web pages to be served by a web server 202. That image and related data can then be retrieved from web server 202 over Internet 204 by a browser 206 or other web client (not shown).

Figure 4:
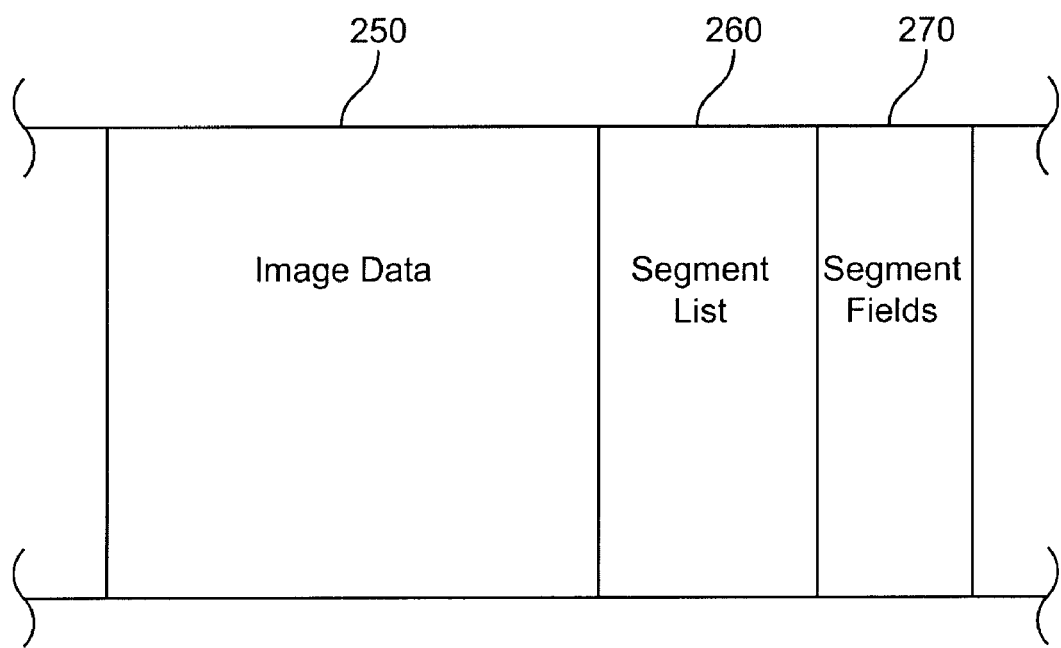
FIG. 4 is an illustration of a data stream comprising an image and related segment data.

Referring now to FIG. 4, one arrangement of image data and the related data as might be transmitted as a data signal are shown in FIG. 4. In this example, the image data 250 is transmitted as a signal (possibly in an industry-standard format) followed by the segment list 260 and segment fields 270.

Figure 5:
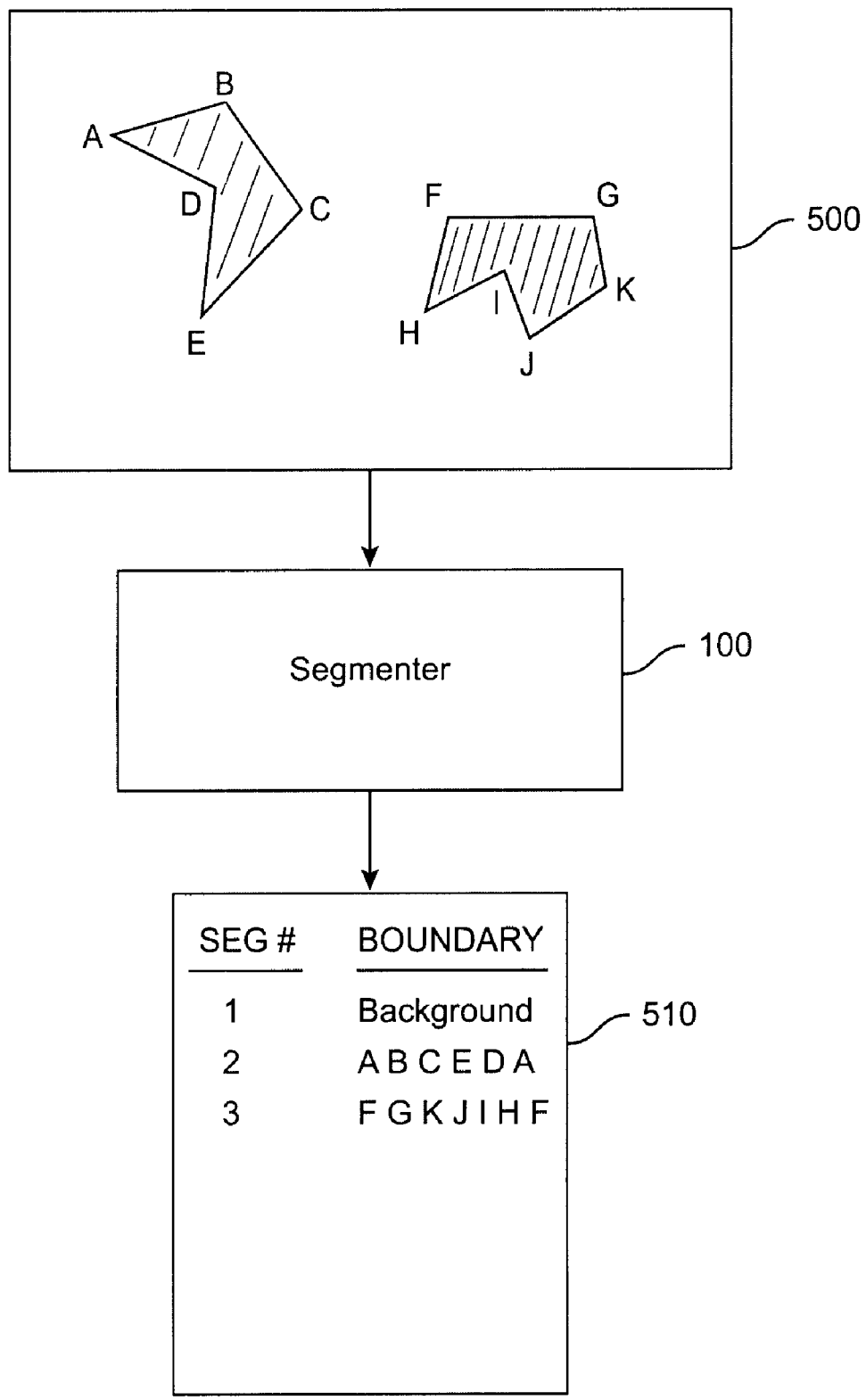
FIG. 5 illustrates how a segment list might appear for a corresponding image.

FIG. 5 illustrates an extremely simple image and its resulting segmentation. As shown, image 500 contains three segments, two polygonal foreground segments and a background segment. Segmenter 100 processes image 500 to generate segment list 510. As shown in the figure, the segment labelled "Seg #1" represents the background segment, the segment labelled "Seg #2" represents the foreground segment bounded by a polygon between points A, B, C, E and D (ending with point A to close the polygon), and the segment labelled "Seg #3" represents the foreground segment bounded by a polygon between points F, G, K, J, I and H (ending with point F to close the polygon). Of course, the typical image being segmented is not usually so well defined, so some or all of the methods described herein might be needed to correctly identify segment boundaries.

As used herein, the term "midpixel" refers to a logical point located in an image relative to image pixels. An edge of a segment runs from midpixel to midpixel, thus separating image pixels on each side of the segment. Midpixels preferably do not lie on the same points on which image pixels lie, but fall between image pixels. While it is not required that midpixels be exactly centered in a rectangle defined by four mutually adjacent image pixels (or other minimum polygon defined by mutually adjacent image pixels on nonrectangular image pixel arrays), without loss of generality, centered midpixels are preferred for the simplicity of arrangement.

Figure 6:
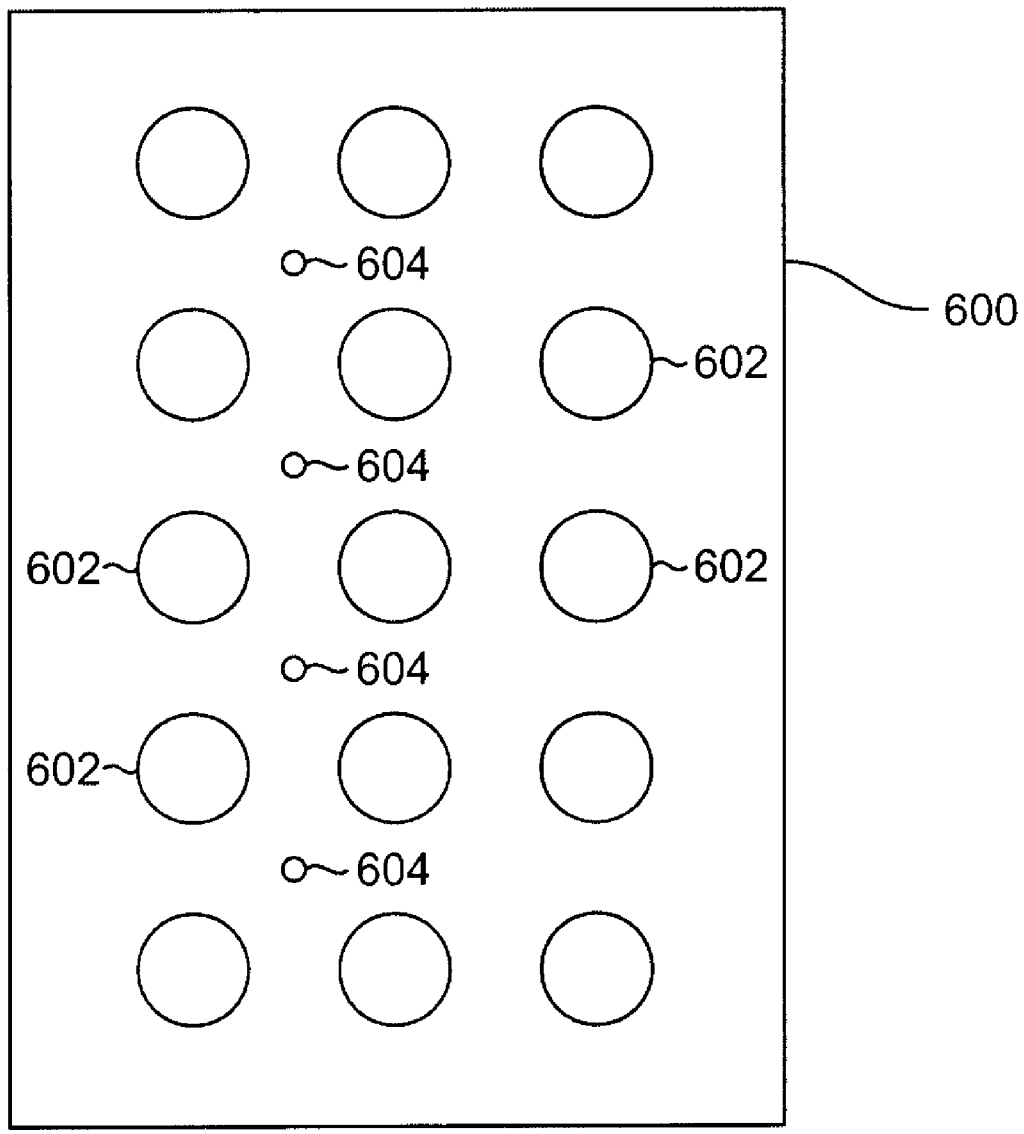
FIG. 6 illustrates edge pixels within an image of black and white image pixels. The edge pixels, illustrated by the smaller, lightly shaded pixels, lie between the black and white image pixels.

Such an arrangement is shown in FIG. 6, where an image 600 comprises image pixels, such as image pixels 602, and midpixels 604 occur between image pixels. As should be apparent, if an edge were specified connecting all midpixels 604 in an order running from top to bottom, or bottom to top, the edge would separate image pixels on the left of the edge from image pixels on the right of the edge.

Where a midpixel is part of an edge, or proposed as part of an edge, it is referred to as an edge pixel. Thus, edges are chains of edge pixels and the image pixels of a segment can be bounded by an edge chain surrounding those image pixels. In some cases, a segment includes image pixels that are exactly on an edge. When an image pixel falls exactly on an edge between two segments (as might occur with a diagonal edge and centered edge pixels), one or more of various tie-breaking routines can be employed to determine to which segment the image pixel should belong. As explained more fully herein, edge pixels are the approximate points in an image where the pixel color values undergo relatively large shifts.

The segmentation process described below comprises several sequences of steps. Not all of the steps need be performed and those that are performed need not be performed in the order listed. The sequences that are initially described are:

1) Progressive Flood Fill—using varying brush sizes to progressively fill regions that might be incompletely bounded;

2) Multiscale Segmenting—creating a plurality of "scale" transformations of the original image and using segments from one scale transformation to guide segmenting at another scale;

3) Composite Edge Detection—detecting edges using a composite image that is a composite of multiple color planes;

4) Multi-class Edge Chaining—generating edge chains using multiple classes of edge pixels;

5) Multiscale Edge Chaining—using information from multiple scales to generate edge chains;

6) Edge Chain Filtering—using various contextual edge characteristics such as multi-scaling, video sequencing, dynamic scales, to filter extraneous edge chains.

The above steps will now be described in more detail, with reference to the figures as needed, followed by some particularly useful combinations of the above steps.

1. Progressive Flood Fill

Figure 7:
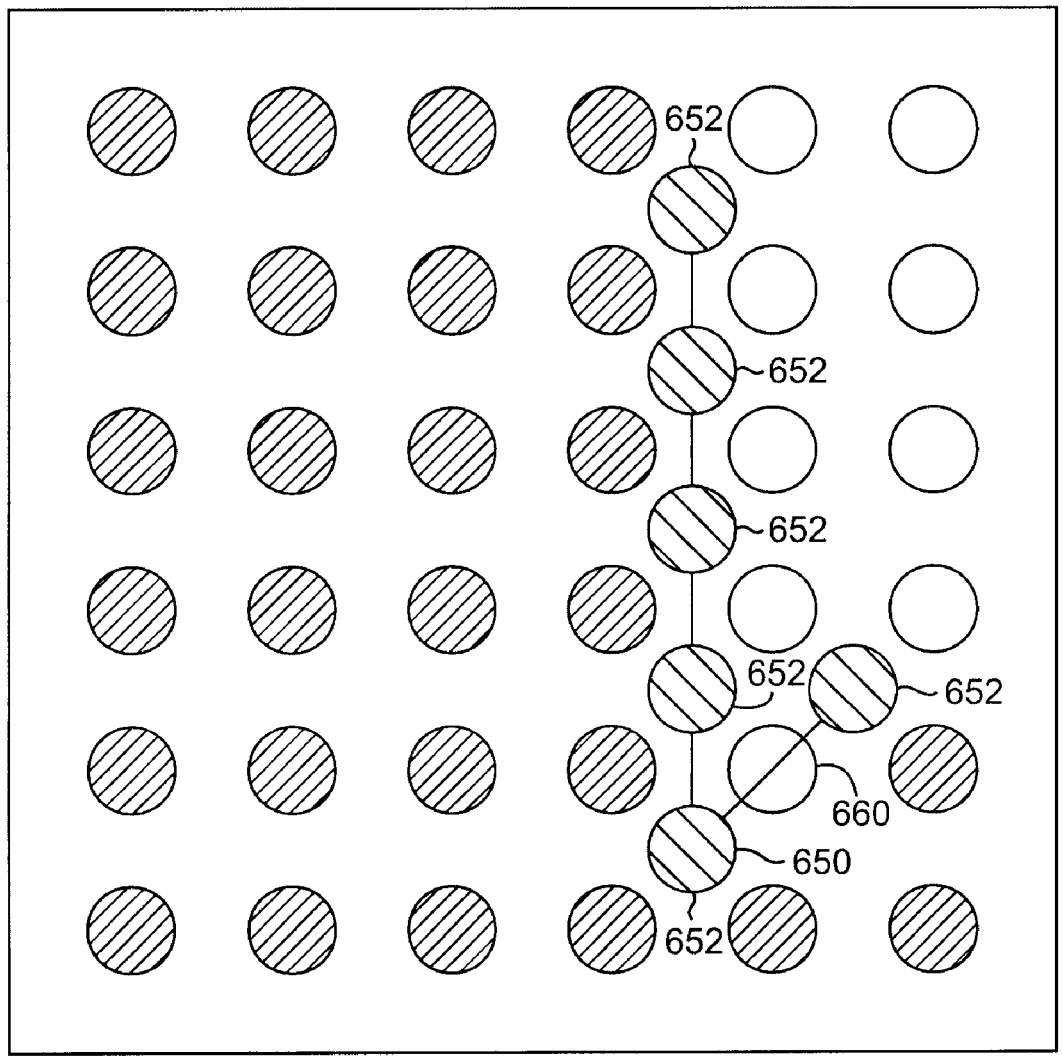
FIG. 7 illustrates an edge chain between two segments of image pixels.
Figure 7:
Figure 7:
Figure 7:

The progressive flood fill process generates closed segment bounds from possibly incomplete edge chains. This process assumes an image with at least some edge chains, where an edge chain is an ordered list of edge pixels logically connected with line segments between edge pixels adjacent in the ordered list. The edge chains for a given image can be generated in a number of ways, including an edge chain generation process described herein. FIG. 7 shows an example of an edge chain 650. Edge chain 650 is defined by the six edge pixels 652 and the line segments that connect the edge pixels.

In general, the progressive flood fill process described immediately below uses a sequence of brushes, from large to small, to "fill" prospective segments. A brush is a logical window or a given shape expressed in pixel units. For example, one possible brush is six-by-six pixel square window, another is a hexagon window, with seven pixels per side. Filling a prospective segment is a process of covering image pixels with the brush, assigning the image pixels a segment value (i.e., a value or number that can be used as a reference to a segment) and moving the brush around the image without the brush covering any portion of an edge chain and without the brush covering a differentially assigned image pixel, i.e., an image pixel previously covered and assigned a segment value different from the segment value currently being assigned to covered image pixels. The set of image pixels that can be reached by the sequence of brushes without covering an edge chain or a differentially assigned image pixel is a set of image pixels associated with the prospective segment.

Figure 8:
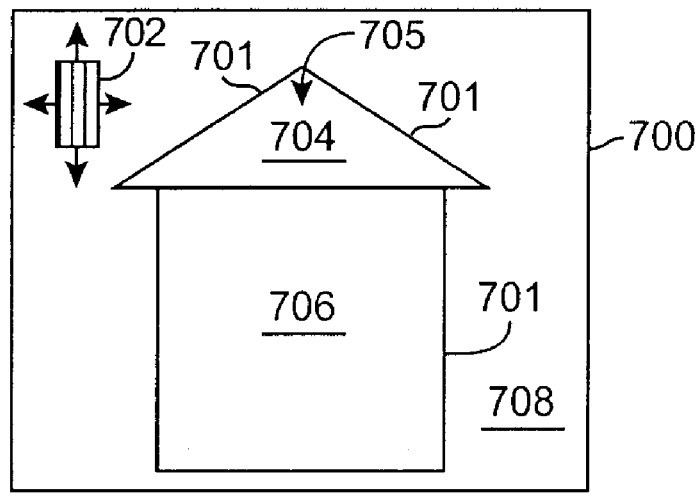
FIG. 8 shows an image to be segmented using a progressive brush.
Figure 8:

For example, consider FIG. 8, which shows an image 700 and a brush 702, where the image has edge chains 701 as marked. Given the size of brush 702, if brush 702 is placed in the triangular area 704, then the filling process will not "bleed" through the gap 705 at the top of area 704, because brush 702 cannot fit through gap 705 without covering part of an edge chain. The first step of the progressive fill process brushes over area 704, square area 706 and background area 708, using a brush of the size indicated. One result of that first step is to associate some, in this case most, of the pixels of the image with respective segments. Some of the image pixels are not associated with segments because brush 702 could not reach those pixels without covering an edge chain.

In one implementation, the processor moves the brush to each accessible location within the image, taking care not to cover an edge chain or a differentially assigned image pixel. At each brush location, the processor considers the underlying midpixels and image pixels. If the brush covers an edge pixel or an edge chain, or a differentially assigned image pixel, the brush has no effect and is moved to the next position. However, if the brush does not cover any portion of an edge pixel, edge chain or a differentially assigned image pixel, the processor examines the underlying image pixels. If any one of the underlying image pixels has already been associated with a segment, all the underlying image pixels are assigned to that segment, otherwise all the underlying image pixels are assigned to a new segment. In the case of a one pixel brush, the processor considers the adjacent image pixels and assigns the image pixel to the segment having the most adjacent image pixels, without crossing any edge chains.

In another implementation, the processor moves two brushes on either side of each detected edge chain, assigning image pixels on either side of the edge chains to, different segments. In yet another implementation, the processor places a brush at any unprocessed location on the image and moves the brush to adjacent locations that can be reached without covering an edge chain.

In another implementation, the processor uses a sequence of incrementally smaller brushes to alternatively create new segments and expand previous segments. Thus, odd numbered passes might create new segments while even numbered passes expand previously created segments.

In yet another implementation, the processor creates a sequence of edge chains in each color component and combines the edge chains to create a composite edge chain picture. The combination may either be the union or intersection of the edge chains in each color component.

Once the processor passes the first brush (or brushes) over the image, some of the image pixels are assigned to segments. These image pixels represent the portions of the image that were accessible to the brush(es). The processor then makes another pass over the image, using a smaller brush. In this second pass, the processor performs the same process with the smaller brush, to cover and assign image pixels that were not "reachable" by the larger brush (i.e., the brush could not cover the image pixels without also covering an edge pixel, edge chain or a differentially assigned image pixel). The process is repeated in subsequent passes, with increasingly smaller brushes until the processor makes a pass with the smallest brush, such as a one-pixel brush.

Preferably, the initial brush size is at least one pixel larger than the largest acceptable gap in an edge chain defining a segment. For example, if a span of five pixels or less between the ends of two edge chains is considered a gap in one larger edge chain, then the initial brush might be a six-by-six pixel square. With such an arrangement, the initial brush would not "bleed" through a gap to incorrectly combine two segments. After the initial brush, subsequent, smaller brushes might be able to bleed through a gap, but the amount of bleeding through would be limited, because on both sides of the gap, there would be previously assigned image pixels which would limit the brush's movements.

Figure 9:
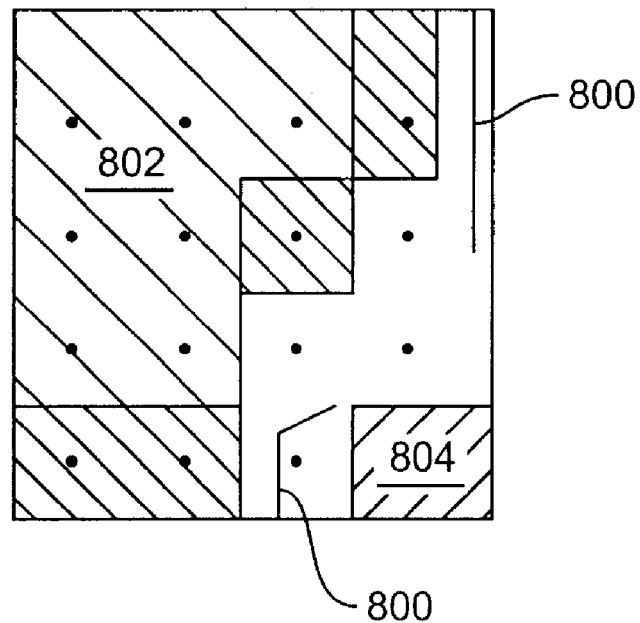
FIG. 9 is an illustration of an image that is partially filled on either side of an edge chain.

FIG. 9 illustrates this point. That figure shows an edge chain 800 with a gap. Edge chain 800 separates two segments 802, 804. In an earlier brush pass, some of the image pixels were assigned to segments and some image pixels, such as those near the gap, were not reachable by the brush. When a smaller brush is used, the brush might be small enough to reach all the remaining unassigned pixels on both sides of the gap, resulting in a bleed through of whichever segment is processed first. To prevent this, the processor will pass two brushes over the unassigned pixels, from either side of the gap, so that both sides of the gap are filled evenly.

To further limit undesirable bleeding of smaller brushes, two brushes can be run in a pass, one on each side of the gap, or one brush can alternate from side to side in the process of assigning image pixels to segments. In some cases, such as for image pixel 660 shown in FIG. 7, even a one-pixel brush is not small enough to reach some image pixels, such as those that are crossed by an edge chain. Those unreachable pixels can be dealt with after the pass using the smallest brush is complete.

One process for dealing with unreachable pixels is to use a tie-breaking scheme to assign an unreachable pixel to one of the segments that meet at the unreachable pixel.

One tie breaking scheme considers the gradient at the image pixel and the gradient at the closest image pixel in each of the contending segments and the image pixel is assigned to the segment that contains the closest image pixel with the gradient closest in magnitude and direction to the gradient at the unreachable image pixel. A gradient is a vector derivative.

Once the process associates each image pixel with a segment, the locations of the boundaries of each segment are easily found. As described below, the progressive fill process might be combined with other processes to more accurately determine segment boundaries.

2. Multiscale Segmenting

Starting with an image, the segmenter generates a plurality of transformations of the image at progressively lower resolutions, also known as "scales", keeping only information regarding the larger, more dominant features from scale to scale. There are several different ways to generate the transformations, such as the use of smoothing or similar filters. One set of transformations that might be useful for some images is an array of Gaussian smoothing filters, where each filter has a different characteristic distance.

In one multiscale segmenting process, the transformed images are processed in order from coarsest to finest, where the coarsest image is the transformation using the widest smoothing filter. Typically, the coarsest image only retains the larger features of the image. The finest image is either the image transformed with the smoothing filter with the smallest characteristic distance or the original, untransformed image.

The process continues by running a segmentation process of the coarsest image to define a set of segments for the coarsest image. The segmentation process can be the progressive fill segmentation process described above, or some other segmentation process performed on single images. Once the segmentation process is performed on the coarsest image, that image's set of segments is used in subsequent segmentation processes performed on finer images.

For example, the second coarsest image is segmented as before, but with a constraint that a segment in the second coarsest image cannot encompass more than one segment in the coarsest image. In other words, the segments in the second image are each subset of the segments in the first image.

The process continues for each next coarser image, using the segments of the previously segmented image. Since the segments of each prior image were constrained to be subsets of its prior image, the segments of any one of the transformed images are, subsets of the segments of any segment in any coarser image.

One method of enforcing the "subset" constraint is to perform an unrestricted segmentation of an image, then subdivide any segment that crosses more than one segment in a coarser image. Another method of enforcing the subset constraint might be used where segmentation is done by the progressive fill process described above. In this latter method, the segment boundaries of the coarser image are added as edge chains in the image being processed, to effect the subset constraint.

3. Composite Edge Detection

The above-described progressive fill process and multiscale segmentation process operate on an image and a set of edge chains, where an edge chain is an ordered set of edge pixels. The edge chains are generated from the edge pixels. The above-described methods might use other methods of edge detection, but one method that is particularly useful when pixel color values comprise multiple color components is the composite edge detection process that will now be described.

In the composite edge detection process, information from the different color components is combined to form a composite image, where each pixel color value in the composite image is a function of the components of the color values of the corresponding image pixel and possibly the color values of surrounding image pixels. The composite image is then used to determine which of the midpixels are edge pixels. Once the edge pixels are determined in the composite image, the edge pixels can be linked into edge chains.

Three methods of composite image processing are described below. The first method combines color information before determining the edge pixels, while the second method determines edge pixels for each color plane and then combines the results into a set of composite edge pixels. The term "color plane" refers to an image, which is an N-dimensional array of pixel color values, where each pixel retains only one of a plurality of the color image assigned to that pixel. For example, if each pixel were assigned a red value, a green value and a blue value, an image where each pixel only had its assigned red value is a color plane image for the red color plane.

In the first method, a composite gradient image comprising an array of gradient vectors, one per pixel, is computed from the color component values for the pixels. The composite gradient image is then processed to detect edge pixels.

One process for generating the composite gradient image generates a composite gradient for each pixel based on the gradients at that pixel in each of the color planes, where the composite gradient for a pixel is a modified vector addition of the gradients in each color plane at that pixel. The modified vector addition is modified in that the signs of the individual vectors are changed as needed to keep the directions of all of the addends within one half plane when there are more than two color planes.

Figure 10:
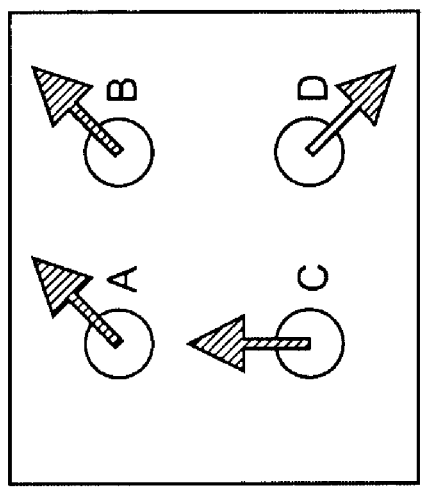
FIG. 10 illustrates gradients for pixels in each of the three color components.
Figure 10:
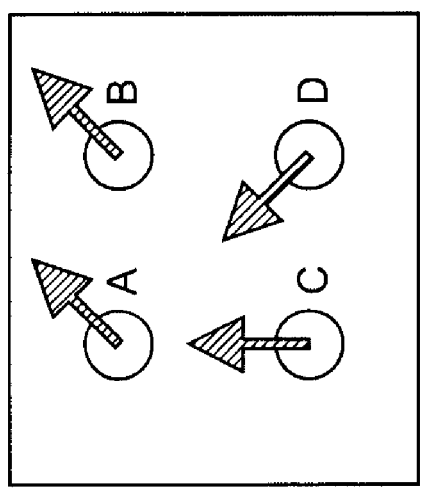
Figure 10:
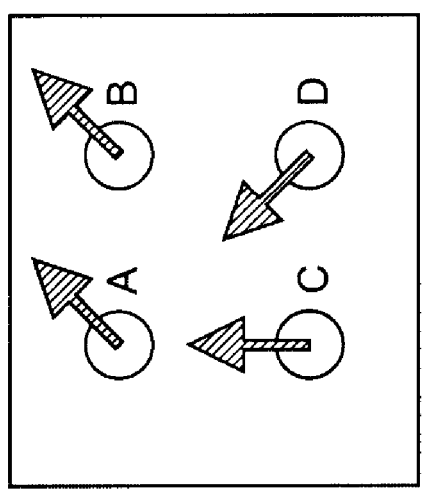

FIG. 10 is used to illustrate such a modified vector addition. As shown there, the vectors in each color plane for pixel A have a range of directions that is less than one half circle, so the composite gradient is just the vector sum of the vectors in each of the components. The same is true of pixels B and C. However, there is no orientation of a half circle that would contain the directions of all of the vectors for pixel D. In the latter case, the sign of one of the vectors is reversed (i.e., pointed in the opposite direction), before the vectors are added.

In effect, this modified vector addition takes into account that for any given point on a given edge, there are two vectors that define the normal to the edge or the tangent to the edge. Consequently, a gradient vector can be reversed and still represent the same edge. By ensuring that the vectors being added all fall within a half circle, the contribution of one component gradient vector is less likely to cancel out the contribution of another component gradient vector.

By ensuring that the addends fall within a half circle, the polarities of the gradients should not greatly affect the outcome of their sum. In many images, the change of the polarity corresponds to a physical characteristic of the image. The polarity of edges in each color component of a YUV image are generally independent of each other. For example, if a bright green region transitions to a dark red region, "Y" decreases and "V" increases.

In some color spaces, the color components might have more influence in evenly weighted addition, due to overall color differences or due to a tendency, in some color spaces, to have more extreme gradient magnitudes, reflective of more pronounced or stronger edges. In such cases, the color components might be weighted with a normalization factor before being added. Good normalization factors are scalar values that result in similar weights for gradient magnitudes in each color plane. For example, where the dynamic ranges between a luminance and chrominance color planes is such that the average gradient magnitude is twice as much in the luminance color plane relative to a chrominance color plane over a sampling of images or a single image, the luminance vector might be normalized by dividing by two before adding the vectors.

Another process for generating the composite gradient image generates, for each pixel, a composite gradient that is equal to, or a function of, the color component vector at that pixel with the greatest magnitude. In this process of taking the largest vector instead of adding vectors, a normalization factor might be applied before the comparison is done to select the vector with the largest magnitude.

However the composite gradient vectors are generated, they collectively form a composite gradient image. From that composite gradient image, edge pixels can be determined and edge chains formed of those edge pixels in order to perform a segmentation process on the image.

4. Multiclass Edge Chaining

Figure 11:
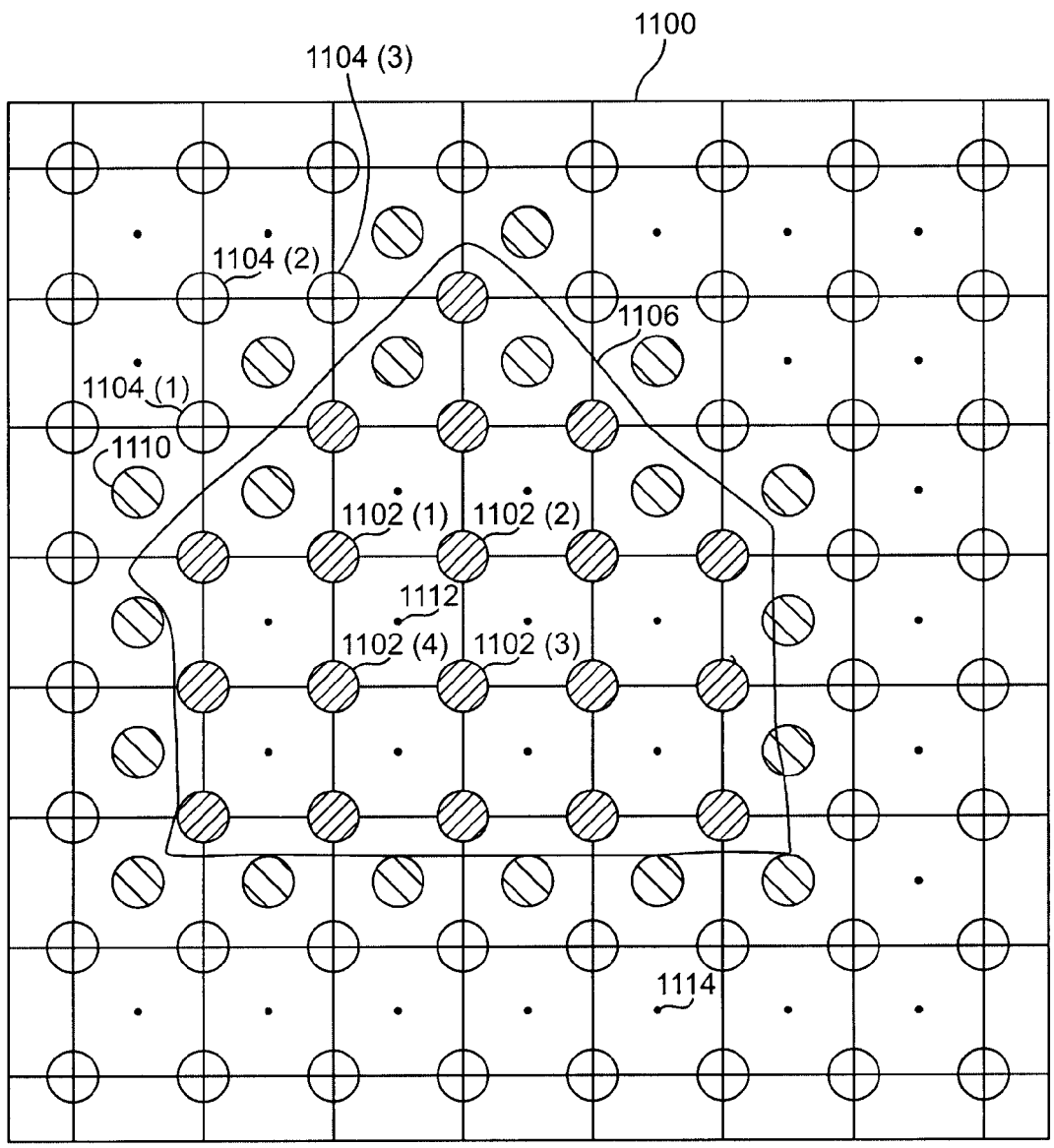
FIG. 11 shows an image with image pixels, edge pixels and an edge.

As explained above, once the edge pixels of an image are identified, those edge pixels are used to identify edge chains and those edge chains are used in a segmentation process. In an edge chain identification ("edge chaining") process described herein, edge pixels are classed into a plurality of classes. In the example described here in detail, with reference to FIG. 11, the plurality of classes is two classes, designated "strong edge pixels" and "weak edge pixels". Edge pixels are the approximate points in an image where the color values undergo relatively large shifts, such as the shift in image 1110 from pixel 1102(l) to pixel 1104(1).

Two methods of identifying edge pixels of each class are described below: the gradient method and the Laplacian method. The gradient method is illustrated with reference to FIGS. 12–13, while the Laplacian method is illustrated with reference to FIG. 14.

In the gradient method, midpixels that are local maxima of gradients of color values in the gradient direction are identified as edge pixels. A local maximum is a point where the value of a function is higher than the function value at surrounding points on one side, and higher than or equal to the function value at surrounding points on the other side.

Figure 12:
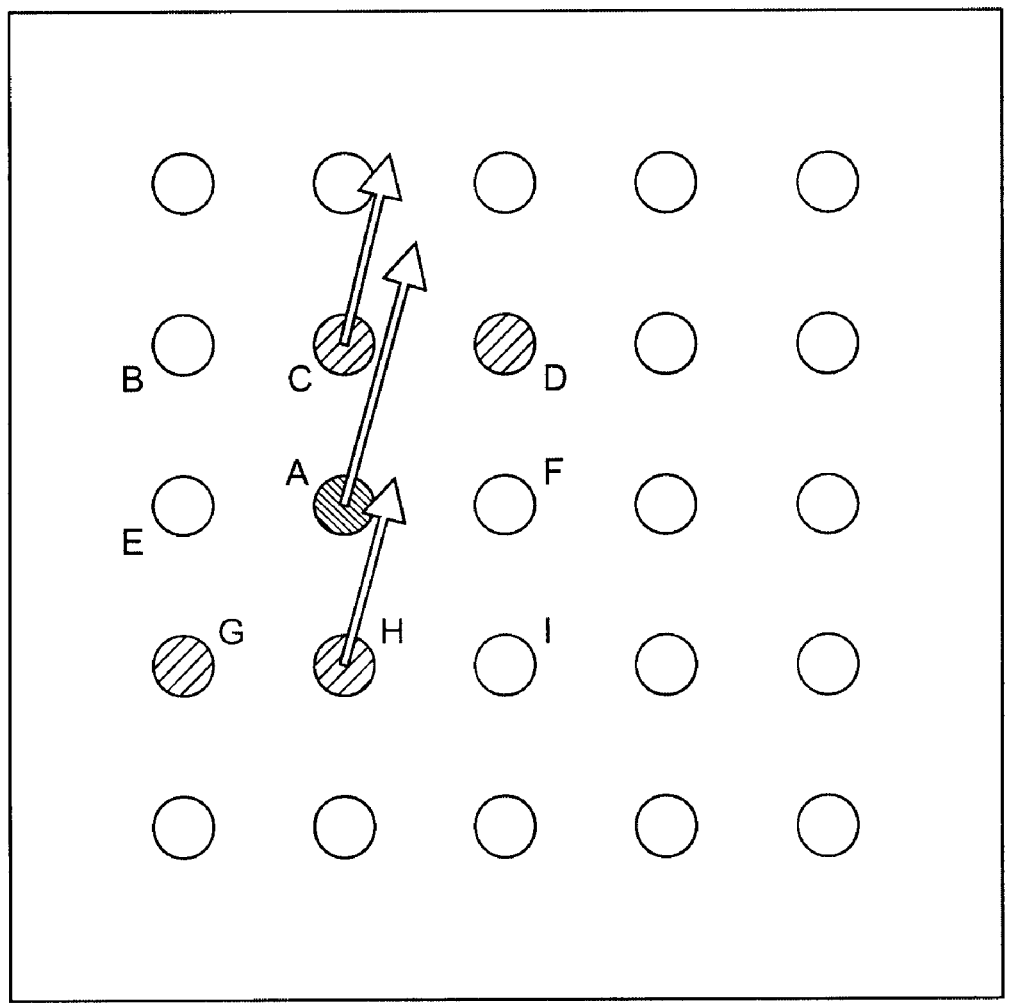
FIG. 12 illustrates a process of determining strong edge pixels using a gradient technique.

For example, consider FIG. 12, which shows an array of midpoints of an image—the image's image pixels are not shown. Several midpoints are shown, some of which are labelled "A" through "I". In the gradient process for determining whether or not edge point A is an edge pixel and, if so, which class of edge pixel, the gradients of the midpixels A through I are considered.

In the gradient method, a processor selects a second midpixel from among midpixels B through I that is closest to a ray originating from midpixel A pointed in the same direction as the direction of the gradient of midpixel A. A tie breaking rule might be used to selection a closest midpixel if two midpixels are equidistant from the ray. In the example of FIG. 12, the closest midpixel is midpixel C. There is a third midpixel that is collinear with midpixel A and the closest midpixel C. In this example, that third midpixel is pixel H. A gradient can be defined at each midpixel, including midpixels A, C and H. Arrows are included in FIG. 12 to illustrate the magnitude and directions of the gradients for those three midpixels.

If the magnitude of midpixel A's gradient is larger than the magnitude of the gradient of one of midpixel C or midpixel H and larger than or equal to the gradient magnitude of the other one of midpixel C or midpixel H, then midpixel A is identified as a strong edge pixel.

Figure 13:
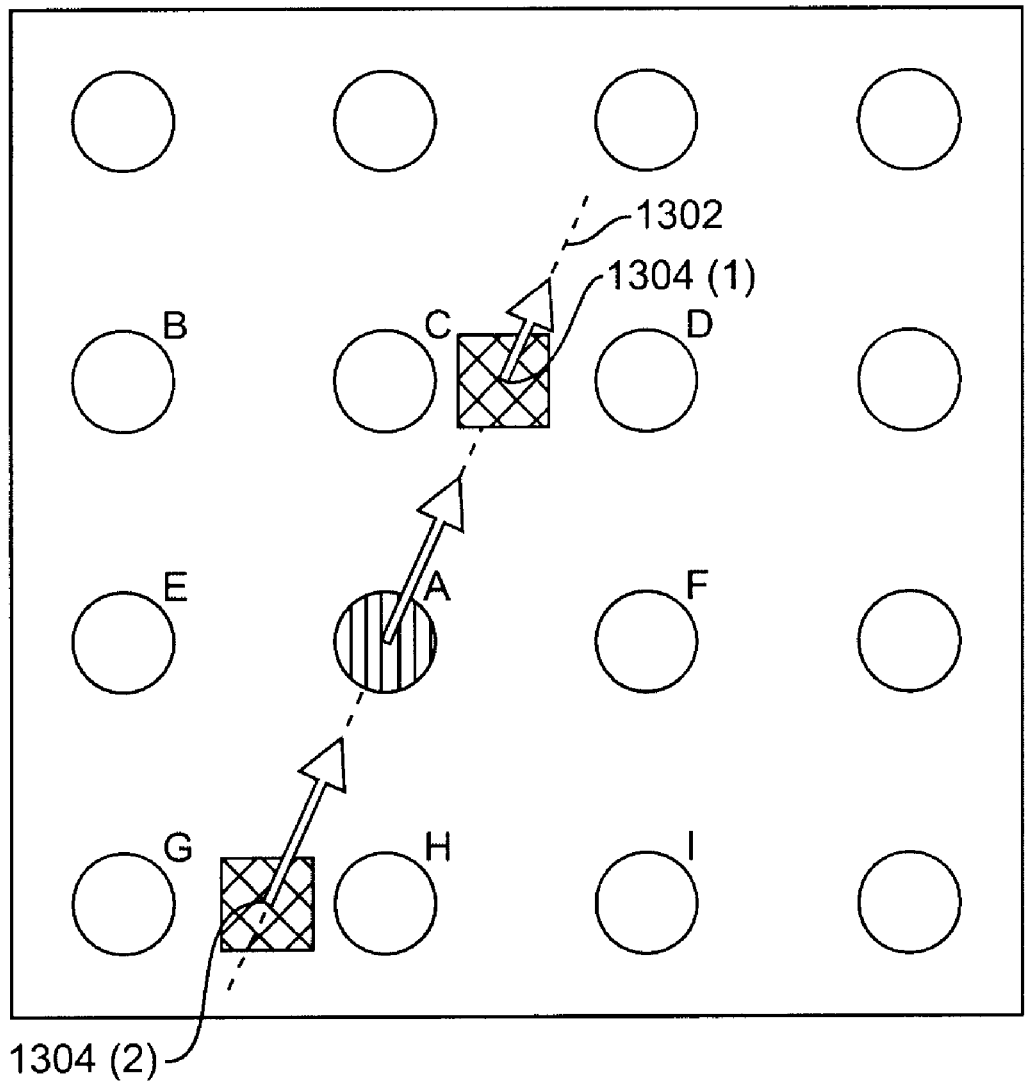
FIG. 13 illustrates a process of determining weak edge pixels using a gradient technique.

If midpixel A is not identified as a strong edge pixel, it is tested to determine if it meets the criteria for a weak edge pixel. FIG. 13 illustrates a process for determining whether a midpixel is a weak edge pixel. As shown there, midpixel A is being considered for weak edge pixel status. To do this, consider a line passing through midpixel A and parallel to midpixel A's gradient direction, shown by line 1302 in FIG. 13. The neighboring midpixels B through I define a square and line 1302 intersects that square at two points, shown as points 1304(1) and 1304(2) in FIG. 13.

The gradients at midpixel A and each of points 1304(1) and 1304(2) can be found through interpolation. If midpixel A's gradient magnitude is greater than the gradient magnitudes of one of point 1304(1) or point 1304(2) and greater than or equal to the gradient of the other of point 1304(1) or point 1304(2), then midpixel A is designated a weak edge pixel. Otherwise, midpixel A is an undesignated midpixel.

In a typical image, more edge pixels are weak edge pixels than strong edge pixels, as weak edge pixels generally correspond to gradual changes in color or intensity in the image or sharp contrasts, while strong edge pixels generally correspond usually only to sharp and unambiguous contrasts.

Figure 14:
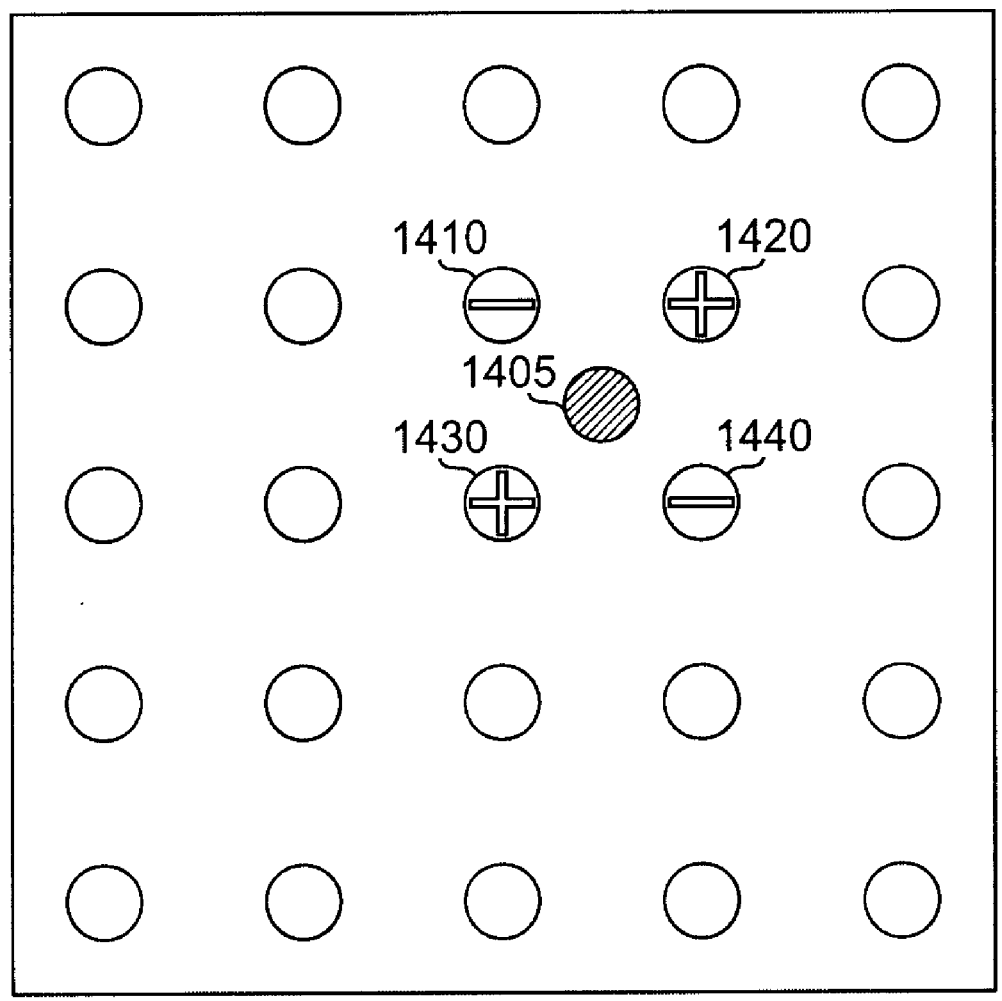
FIG. 14 illustrates a process of determining strong edge pixels using a Laplacian technique.

Referring now to FIG. 14, the Laplacian method will now be described with reference to determining the edge pixel status of a midpixel 1405 located within the rectangle defined by four image pixels 1410, 1420, 1430, 1440. Each of the four image pixels are labelled with a sign "+" or "−" representing the sign of the Laplacian function at that image pixel. The Laplacian is a second vector derivative. In an image, zero crossings of the Laplacian function applied to the pixel color values are edge pixels The zero crossings of the Laplacian occur where the second derivative of the Laplacian is zero.

If the rectangle enclosing midpixel 1405 contains a zero crossing, midpixel 1405 is an edge pixel. With discrete pixel locations, calculating the location of a zero crossing is either not possible or is computationally difficult. However, the signs of the Laplacian at the image pixels are indicative of the likelihood of the zero crossing being in the rectangle. Consequently, the Laplacian method identifies a midpixel as a strong edge pixel if the signs of the Laplacian function at each of the four surrounding image pixels are different both vertically and horizontally (i.e., the upper right and lower left pixel have one sign and the lower right and upper left have another sign). If the signs are such that there is one instance of one sign and three instances of the other sign, or if there are two instances of each sign that are not both different vertically and horizontally, then the midpixel is identified a weak edge pixel. If the signs are the same for all four image pixels, the midpixel is identified as not being an edge pixel.

Figure 15:
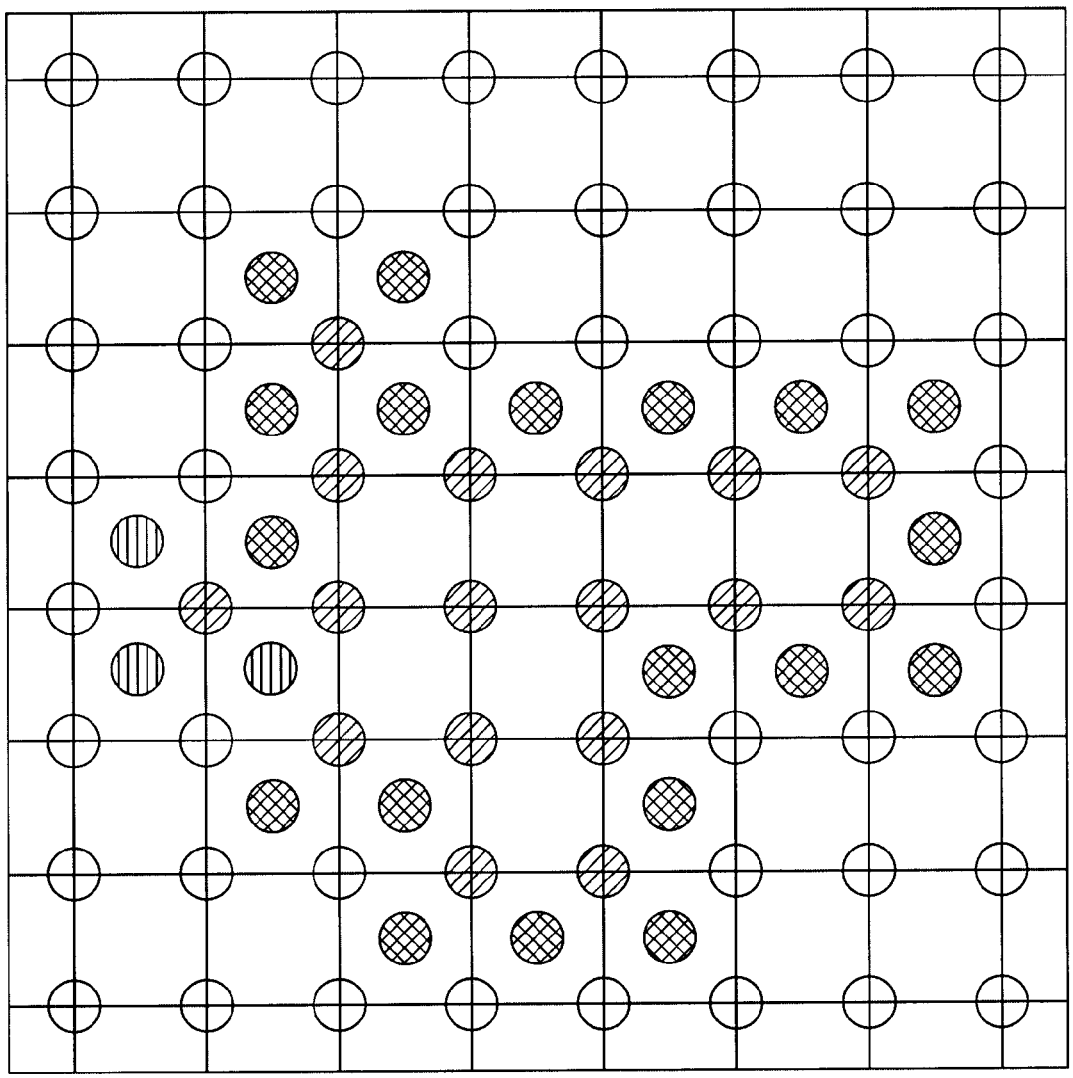
FIG. 15 shows an image with image pixels and edge pixels identified, including strong edge pixels and weak edge pixels.

Two methods of identifying multiple classes of edge pixels have been described, but other suitable methods might be used instead. An example of a result of identifying classes of edge pixels is illustrated in FIG. 15. The image in FIG. 15 comprises two segments, an interior segment of black pixels and an exterior segment of white pixels. The results of an edge pixel detection process are shown, with identified strong edge, pixels and identified weak edge pixels shown; nonedge midpixels are omitted from FIG. 15. In general, strong edge pixels are midpixels that correspond to a large and/or definite shifts in the image (e.g., sharp contrasts), while weak edge pixels reflect subtle changes in the image that may be due to actual color edges or might be caused by color bleeding or noise.

Once the edge pixels of differing class are identified, edge chains can be identified. An edge chain is identified as an ordered set of edge pixels. One way to identify edge chains from edge pixels of differing classes is to start with an arbitrary strong edge pixel and add it to an edge chain as one end of the edge chain. Then look to the nearest neighboring midpixels of the added edge pixel for another strong edge pixel. If one exists, extend the edge chain to the neighbor, by adding the edge pixel to the growing end of the edge chain. If more than one strong edge pixel neighbor exists, select the one with the closest gradient that is perpendicular to the direction of the gradient of the edge pixel. As a further test, the magnitude of the gradient at each neighbor can be considered. If no strong edge pixels exist among the nearest neighbors, extend the edge to a neighbor that is a weak edge pixel and if more than one exists, select the best choice using a test similar to that for selecting among multiple strong edge pixels. If no strong or weak edge pixels exist to continue the edge chain, the chain stops and the process seeks another arbitrary strong edge pixel.

The process repeats until all the edge pixels have been processed or considered, resulting in a set of edge chains for an image. These edge chains can then be used in a segmentation process to segment an image.

5. Multiscale Edge Chain Generation

With multiple transformed representations of an image, the coarser scale images can provide guidance to the finer scale images. The coarser scales can provide guidance when there is an association of edge pixels across the scales. Association of edge pixels occurs when an edge pixel in one scale has the same or similar gradient magnitude and direction as the same edge pixel, or an adjacent edge pixel, in another scale. The sameness or similarity of two gradient vectors are tests that might take into account weighting factors between scales.

One multiscale edge chain generation process according to the present invention uses edge pixels from a plurality of scale images to identify edge chains. Finer scale images tend to have more edges than coarser scale images, so a linking routine that identifies edge chains in a finer scale image will often encounter, at the end of an ledge chain, multiple edge pixels to which the edge chain can extend. Some methods of deciding which edge pixel to select are described above. When multiple scale images are available, the selection process can be refined.

Figure 16:
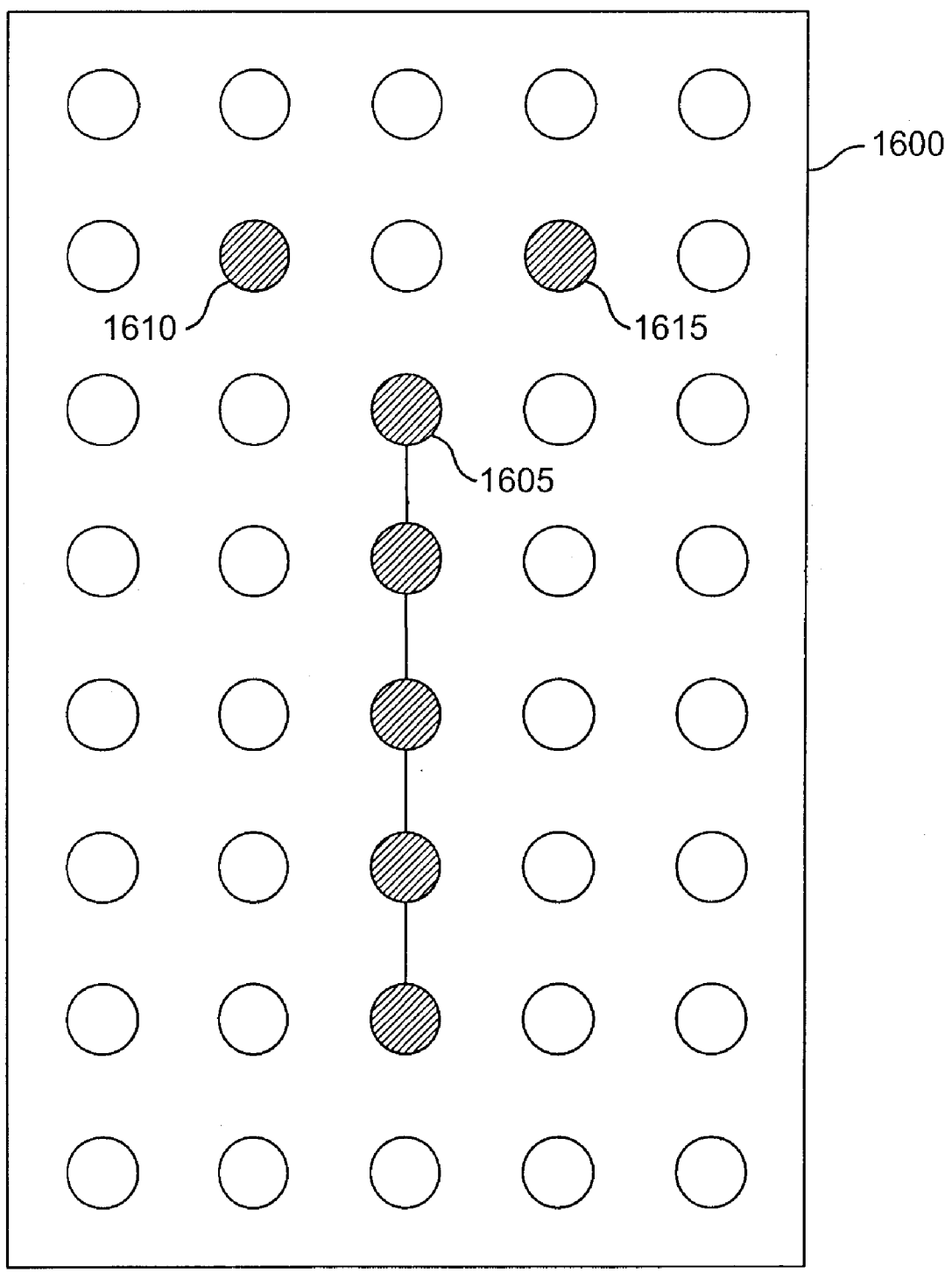
FIG. 16 illustrates a process for selecting among edge pixels in generating an edge chain.

In one approach, where a process is faced with a choice among the neighboring edge pixels and edge chains have been identified for coarser scales, the process favors in its selection edge pixels that would result in extending the edge chain along an edge chain at coarser scales. For example, consider FIG. 16, which shows a midpixel array 1600, with edge pixels shown as filled circles and nonedge pixel midpixels as open circles. Suppose an edge chain has been identified and the end of the edge chain is at edge pixel 1605. The linking process is faced with a decision to extend the edge chain to edge pixel 1610 or edge pixel 1615. Suppose further that midpixel array 1600 is the result of edge pixel identification at a finer scale than a prior array and that in the prior, coarser array, an edge chain was identified that included edge pixels associated with edge pixel 1605 and edge pixel 1610, but not edge pixel 1615. In that case, the linking process would favor edge pixel 1610.

Figure 17B:
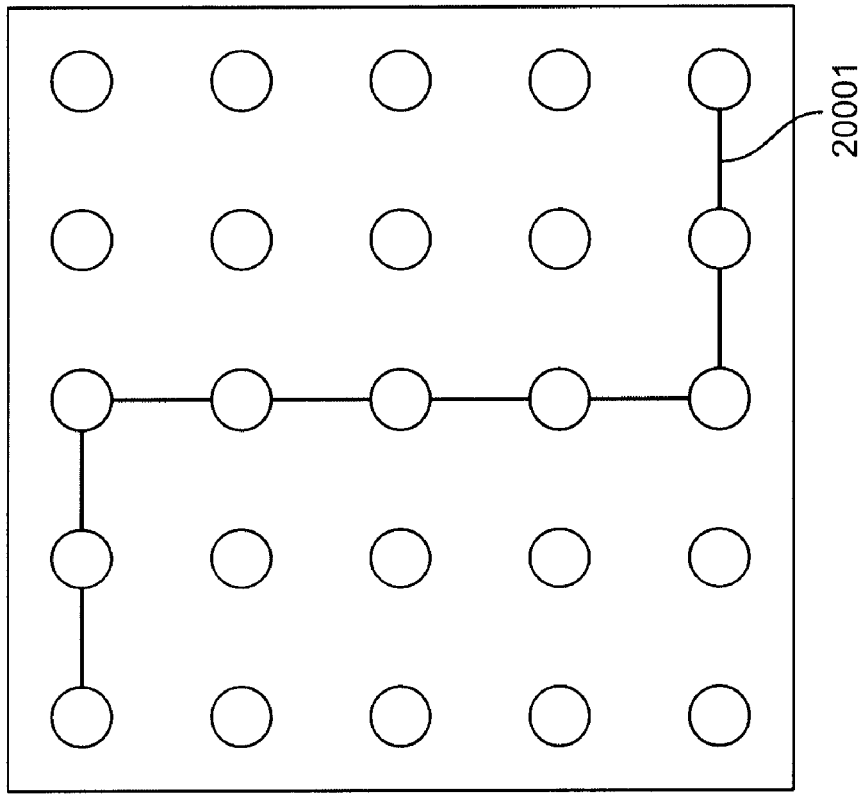
Figure 17A:
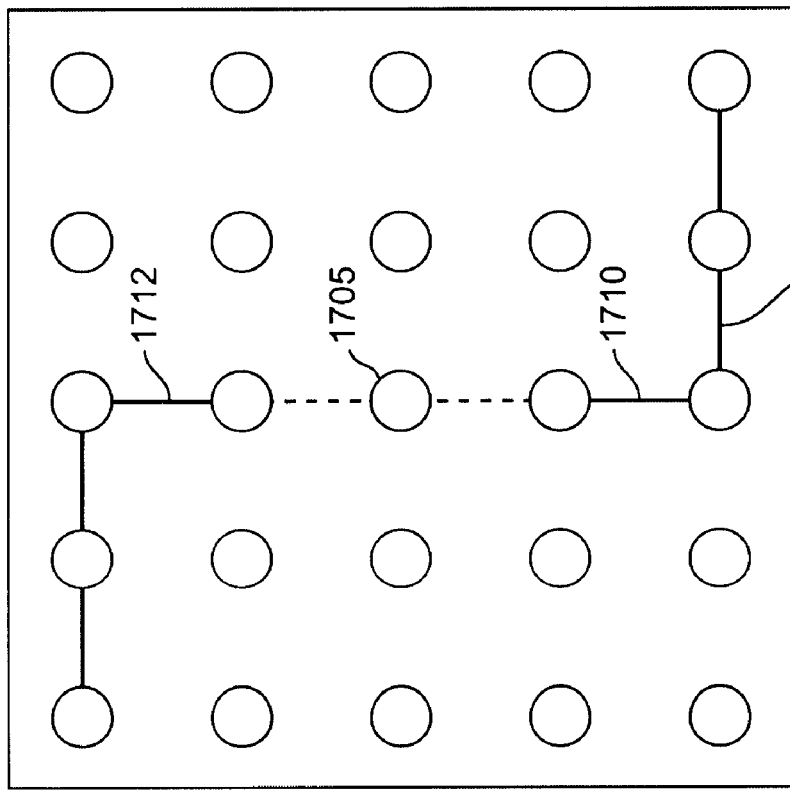
FIG. 17(a) shows two edge chains with a gap.

In some embodiments, the edge chains at coarser scales are determinative and edge pixel 1610 would be added to the edge chain without further inquiry. In other embodiments, other factors are taken into account along with the coarser scale correspondences. In yet other embodiments, a midpixel might be selected even if it is not an edge pixel, if an edge chain at a coarser scale indicates that the edge chain should be continued over a gap, as illustrated in FIGS. 17(a)–(b). As shown there, midpixel 1705 is not an edge pixel at the finer scale, so the edge chains 1710, 1712 would not reach midpixel 1705. However, at the coarser scale, the corresponding midpixel is an edge pixel and is included in an edge chain. Consequently, midpixel 1705 would be added to an edge chain at the finer scale, resulting in a continuation that joins edge chain 1710 and edge chain 1715. Additionally, edge pixels from different finer scale edge chains may be associated with the same edge chain in a coarser scale. In such cases, two finer scale edge chains are joined in such a way as to duplicate as much of the coarse edge chain geometry as possible.

Figure 18A:
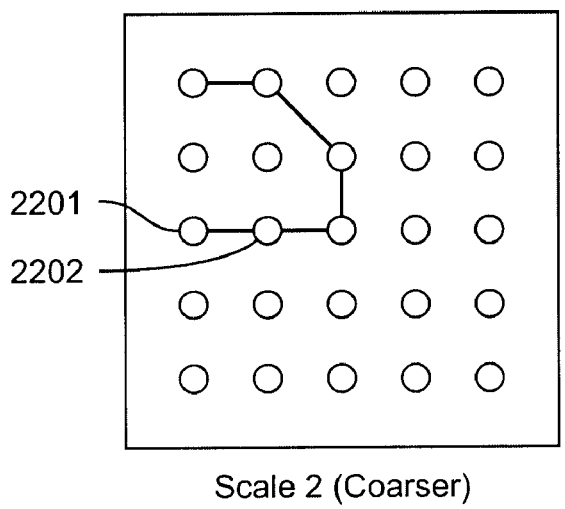
FIG. 18(a) shows an edge chain from a coarser scale.
Figure 18B:
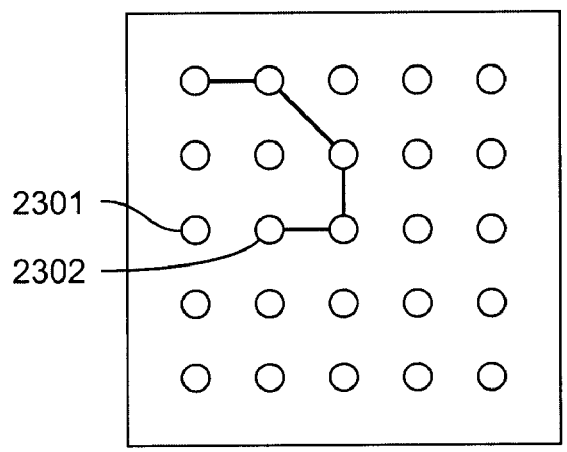
FIG. 18(b) shows an edge chain from a finer scale.
Figure 18C:
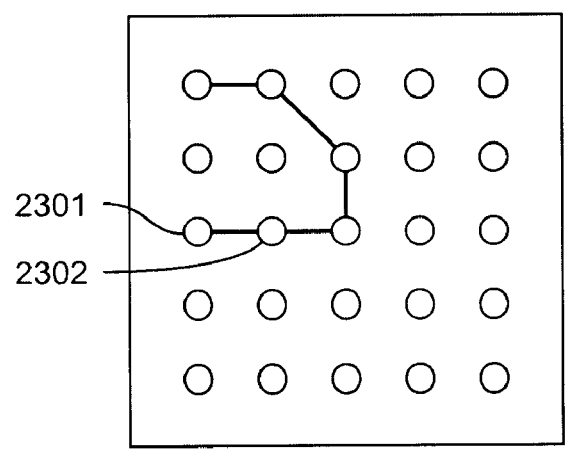
FIG. 18(c) shows their combination.

Further, as shown in FIGS. 18(a)–(c), where an edge chain at a coarser scale is longer than the associated chain in the finer scales, the linking process will lengthen the finer scale edge chain appropriately. This is referred to as "edge chain lengthening". In the example shown, two chains have the same edge pixels in the same order except that in the finer scale (FIG. 18(b)), the chain stops at midpixel 2302, while the coarser scale image edge chain continues one more midpixel from midpixel 2202 to midpixel 2201 (FIG. 18(a)). The process will then continue the finer edge chain to link to midpixel 2301 as shown in FIG. 18(c).

Figure 19A:
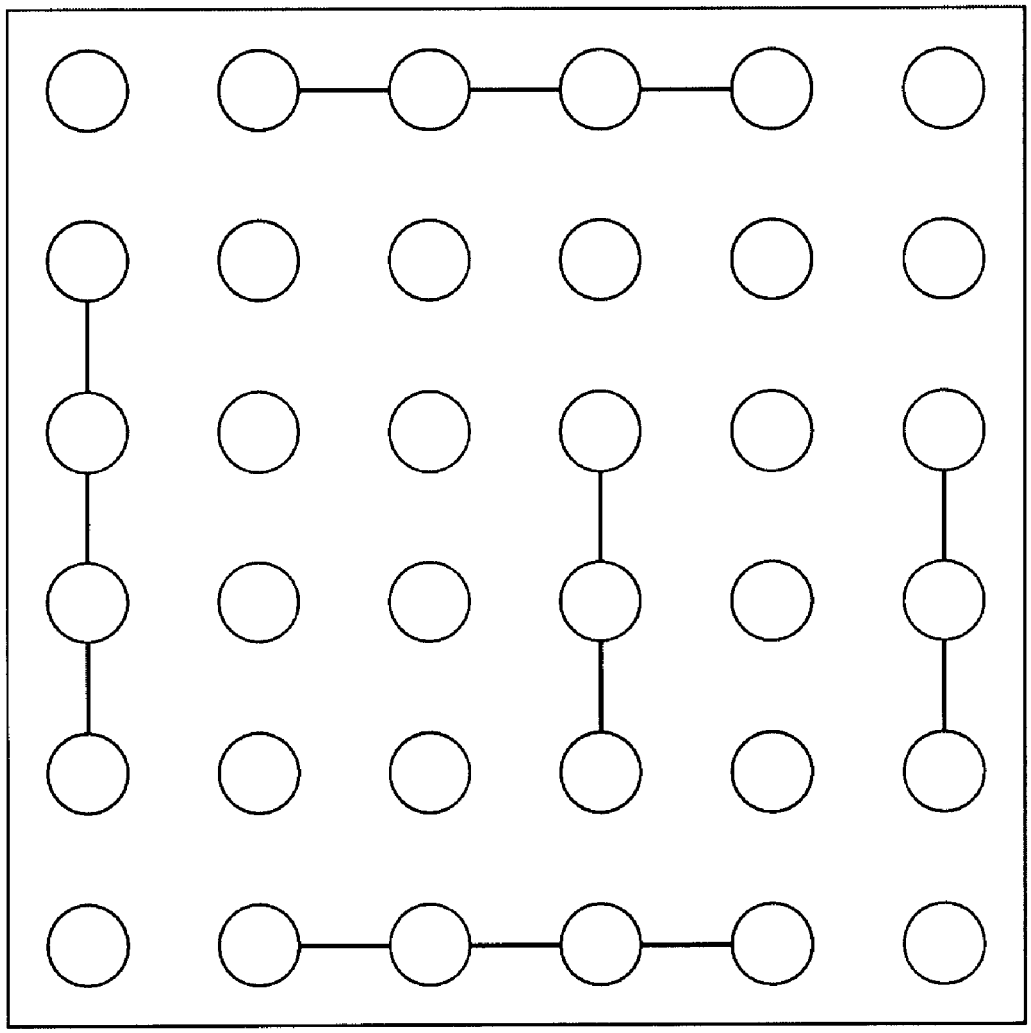
FIG. 19(a) shows an image before edge chains are extended.
Figure 19B:
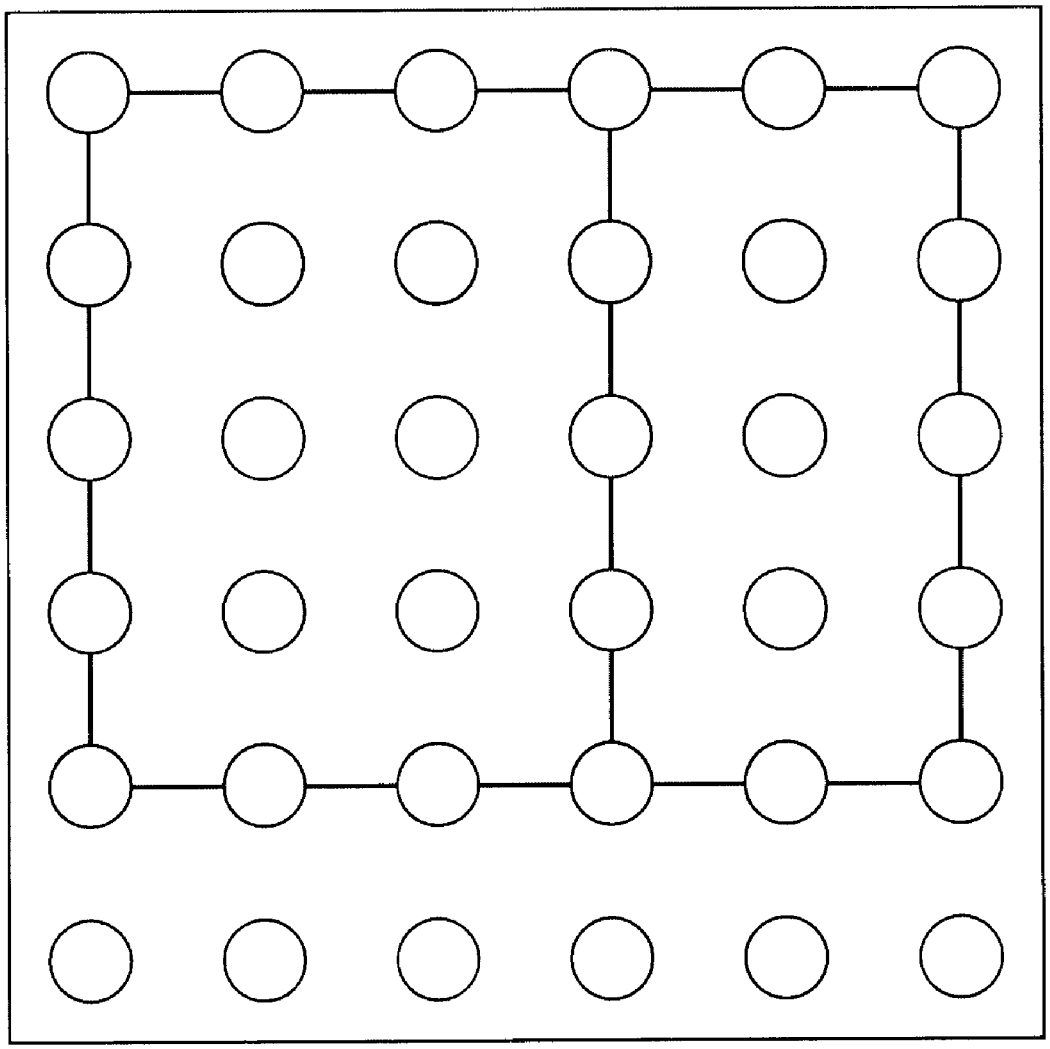
FIG. 19(b) shows the image after edge chains are extended.

As illustrated in FIGS. 19(a)–(b), once an edge chain has been completely generated, the linking routine might add a few more midpixels to each end of the edge. This often has the effect of closing small gaps between edge chains, and often completely enclosing a given region. By adding one more pixel to each edge chain shown in FIG. 19(a), unenclosed regions become completely bounded, as shown in FIG. 19(b).

In a variation of the basic process for using multiscale associations in edge chain linking, multiple classes of edge pixels might be used. In one embodiment, edge chains are extended from an edge pixel end to another midpixel based on the class of the neighbors and any associations from coarser scales. For example, a linking process might first consider only strong edge pixels and look for a corresponding edge chain extension in a coarser scale, then considering weak edge pixels if not strong edge pixels or associations are found. In another variation, the linking process might first consider, strong edge pixels then weak edge pixels and then only look for a corresponding edge chain extension in a coarser scale that uses strong or weak edge pixels, if no edge pixels are found at the finer scale.

6. Edge Chain Filtering

Figure 20A:
FIGS. 20(a)–(e) are images with various degrees of edge chain filtering.
Figure 20B:
Figure 20C:
Figure 20D:
Figure 20E:

FIG. 20(a) is an edge chain image resulting from a process that identifies edge chains. In that edge chain image, there are many short edge chains that do not correspond to segment edges. Such spurious edges might occur when an edge chain is created primarily as a result of digitization errors or subtle changes in shading in the image.

FIGS. 20(b)–(e) are the results after applying a threshold routine to the image at each scale. The threshold routine can generate the images of FIGS. 20(b)–(e) using a static sliding scale or a dynamic sliding scale. In the static method, edge chains are removed if they do not meet both a baseline length requirement and a minimum intensity requirement.

The dynamic sliding scale test is more inclusive. The length and intensity thresholds are related. Thus, the longer a chain is, the lower the intensity threshold that must be met for retention of the edge chain. Similarly, the brighter the edge chain is, the lower the length threshold becomes.

In one implementation, edge chains are retained across scales despite thresholding. Specifically, edge chains are associated across scales and edge chains that survive thresholding in coarser scales are retained at finer scales, even if they would not survive thresholding at the finer scale if considered apart from the coarser scales. In another implementation, chains from previous video frames can prevent edge chains from being discarded.

Figure 21A:
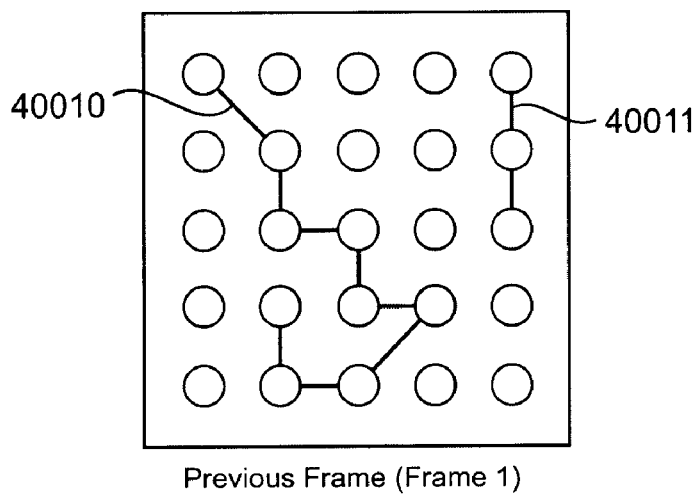
FIGS. 21 (a)–(c) illustrate a process of edge chain filtering over video frames.
Figure 21B:
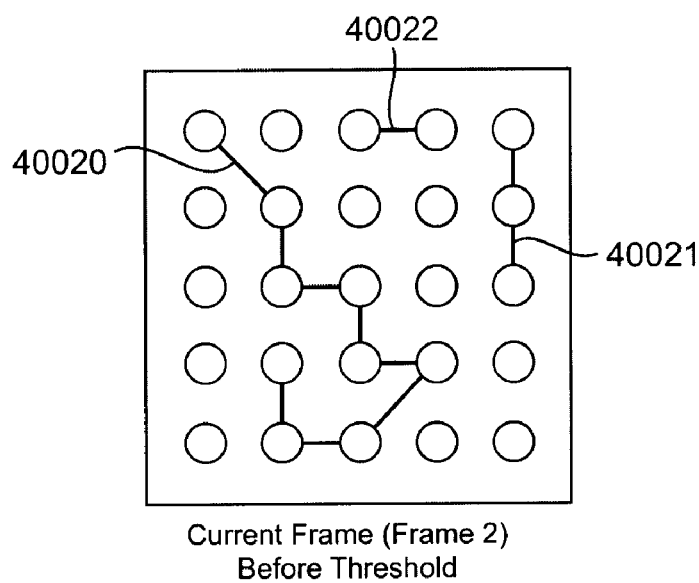
Figure 21C:
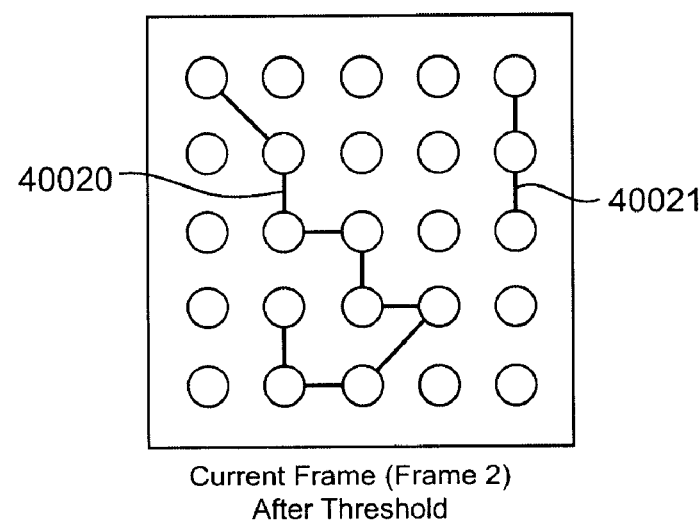

FIG. 21 illustrates the situation where the origin of the input image is a video sequence. Note that the edge chain information at each scale is retained across the frames. FIG. 21(a) shows a prior frame of video; FIG. 21 (b) shows a current frame of video; and FIG. 21(c) shows the current frame after thresholding based on the prior frame.

The prior frame is shown after thresholding, and edge chain 40011 was retained. The edge chains of the current frame include edge chains 40020, 40021, and 40022. Edge chains 40011 and 40021 are associated across frames because edge chains 40011 and 40021 share pixels with identical locations and similar gradients. In the current frame, edge chain 40020 passes the thresholding tests described above, so it will be retained. However, neither edge chain 40021 nor 40022 pass the thresholding tests, so they are candidates for removal. To ensure consistent segmentation across frames, edge chain 40021 is retained since it is associated with edge chain 40011, which was retained in the previous frame. Conversely, edge chain 40022 is not retained because it failed the threshold tests and is not associated with an edge chain retained in the prior frame.

7. Combinations

Six methods and corresponding apparatus for improving segmentation are described above. One or more of these methods and apparatus can be combined for greater improvement in the segmentation process. For example, progressive filling can be used over multiple scales, where the filling process is performed at the coarsest scale, then the segments at the coarser scales are used to guide segmentation at the finer scales.

Another combination is the combination of composite edge detection with multiple classes of edge detection. With that combination, an edge detection process would operate separately on each color plane to identify strong and weak edge pixels, then filter by combining edge pixels from different color planes.

In another variation, the color information is used at a later stage, after the strong and weak edge pixels have been identified, but before the edge chains are identified. An edge pixel identification routine creates two composite edge pixel images at each scale. The first image is of all the strong edge pixels from all color planes and the second image is of all the weak edge pixels from any color plane. Sometimes, the same edge pixel will be designated in multiple color components. In that situation, the edge pixels are only included in the composite image once. Edge pixels in multiple color components are designated identical if one of two conditions is met, 1) they share identical location in different color components, or 2) they share the same array locations in different color components and have similar gradients.

Yet another combination is a method wherein the edge chains are found in each component and then the edge chains are composited. In particular, the local extrema found in each color component are initially kept separate from the extrema found in the other color components of the image. The linking process creates edge chains by linking edge pixels in each color component separately, then combining the edge chains into one composite image. Because it is possible, even likely, that some of the edge chains determined by the gradients of one color component will be similar to edge chains determined by the gradients of the other color components, the linking process coalesces similar chains into one chain possibly forming longer chains with fewer gaps. Edge, chains in the same scale are similar if they satisfy one or more of the following criteria: 1) identical in all respects; 2) share the majority of their pixels with each other; 3) identical in geometry (to within a small variance) but offset by very few pixels; 4) are both associated with the same coarser scale edge chain in another scale.

In yet another combination, all of the above processes are combined to form an improved segmentation process.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of detecting edges in a digital image, where the digital image comprises a rectangular array of pixels each having a pixel location and a pixel color value and where an edge represents a transition in the array between the pixels representing one segment of the digital image and pixels representing another segment of the digital image, the method comprising the steps of:

identifying edge points of the digital image, where an edge point is a point in the array of pixels between point locations that are pixel locations;

locating each edge point at the center of a rectangle defined by four mutually adjacent pixels in the pixel array;

identifying a plurality of classes of edge points, including a more certain class of edge points and a less certain class of edge points where an edge point in the more certain class is more likely to be representative of an edge of a segment of the digital image than an edge point in the less certain class; and identifying edges by linking adjacent edge points of the more certain class for forming edge point chains;

when gaps are present between edge point chains, identifying edge points in the less certain class to span gaps in the edge point chains; and using the edge point chains as representations of the edges in the digital image.

2. The method of claim 1 where the plurality of classes include more than two classes and each class has a relative certainty associated with the edge points in the class with the relative certainties of each class being orderable and distinct from the relative certainties of other classes, the method further comprising a step of identifying edge points in a class for use in joining edge chains, before edge points in less certain classes are used, but after edge points in more certain classes are used.

3. A method of segmenting a digital image into a plurality of segments defined by edges of objects in the digital image, where the digital image comprises an array of pixels each having a pixel location and a pixel color value and where an edge represents a transition in the array between the pixels representing one segment of the digital image and pixels representing another segment of the digital image, the method comprising the steps of:

identifying a set of edge chains, where an edge chain represents a border between two segments and at least one edge chain is not part of a closed loop enclosing and defining a segment;

setting a maximum allowable threshold for gaps in edge chains;

positioning a first brush in a first location in the array such that the first brush does not overlap any edge chains, wherein a brush is a pixel window movable over the array and wherein the first brush is a pixel window of a size such that the first brush cannot pass through a gap in edge chains that is no wider than the maximum allowable threshold without the first brush overlapping an edge chain;

associating pixels with a segment where each pixel associated with the segment is a pixel reachable by the first brush from the first location without the first brush having to pass through a gap smaller than a width of the first brush;

associating other pixels with other segments using the first brush positioned in second and subsequent locations in the array; and repeating the steps of positioning and associating using a second brush that is smaller than the first brush, to associate pixels that were not already associated in the steps of positioning and associating.

4. The method of claim 3, wherein the first brush is a square pixel window with each side of the square being a number of pixels one greater than the maximum allowable threshold.

5. The method of claim 3, wherein the step of repeating is performed with successively smaller brushes until a brush with an area of a single pixel is used.

6. The method of claim 5, further comprising a step of assigning unassigned pixels to segments when unassigned pixels remain after the processes of repeating have been performed for each brush.

* * * * *